United States Patent
Liu et al.

(10) Patent No.: US 11,444,879 B2
(45) Date of Patent: Sep. 13, 2022

(54) DEEP PACKET INSPECTION INDICATION FOR A MOBILE CDN

(71) Applicant: QUALCOMM Incorporated, San Diego, CA (US)

(72) Inventors: Huichun Liu, Beijing (CN); Xipeng Zhu, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/678,174

(22) Filed: Nov. 8, 2019

(65) Prior Publication Data
US 2020/0153743 A1    May 14, 2020

Related U.S. Application Data

(63) Continuation of application No. 15/750,110, filed as application No. PCT/CN2015/086101 on Aug. 5, 2015, now Pat. No. 10,476,806.

(51) Int. Cl.
*H04L 1/00*    (2006.01)
*H04L 47/2483*    (2022.01)
(Continued)

(52) U.S. Cl.
CPC .......... *H04L 47/2483* (2013.01); *H04L 43/00* (2013.01); *H04L 43/10* (2013.01);
(Continued)

(58) Field of Classification Search
None
See application file for complete search history.

(56) References Cited

U.S. PATENT DOCUMENTS 8,782,395 B1    7/2014 Ly
8,909,728 B2    12/2014 Kotecha et al.
(Continued)

FOREIGN PATENT DOCUMENTS

CN    101023419 A    8/2007
CN    101133592 A    2/2008
(Continued)

OTHER PUBLICATIONS

CMCC: "Motivation and Solutions for UE Assisted Local Caching", R2-1708992, Motivation and Solutions for UE Assisted Local Caching-v2, 3rd Generation Partnership Project (3GPP), Mobile Competence Centre, 650, Route Des Lucioles, F-06921 Sophia-Antipolis Cedex, France, vol. RAN WG2, No. Berlin, Germany; Aug. 21, 2017-Aug. 25, 2017 Aug. 20, 2017, XP051318788, Retrieved from the Internet: URL:http://www.3gpp.org/ftp/Meetings_3GPP_SYNC/RAN2/Docs/ [retrieved on Aug. 20, 2017], 4 pages.
(Continued)

*Primary Examiner* — Clemence S Han
(74) *Attorney, Agent, or Firm* — Qualcomm Incorporated

(57) ABSTRACT

Systems and techniques are disclosed to reduce workload on base stations in a mobile network when content delivery networks cache content inside the network. A user equipment sets a flag only with those packets on the uplink which include requests that should be routed to the cache server inside the mobile network. The base stations perform deep packet inspection of those packets where flags have been set and forward other packets on to the rest of the relevant backhaul of the mobile network. After deep packet inspection, the base stations either route the packet to the cache server via an established connection or propagate the flag in an extension header to another network node for routing to the cache server. The resulting content is returned to the UE with the source address of the originally intended destination
(Continued)

instead of the cache server, rendering the process transparent to the end user.

50 Claims, 11 Drawing Sheets

(51) Int. Cl.
    *H04L 45/302*     (2022.01)
    *H04L 43/00*     (2022.01)
    *H04L 67/63*     (2022.01)
    *H04L 67/568*     (2022.01)
    *H04W 76/12*     (2018.01)
    *H04L 43/10*     (2022.01)

(52) U.S. Cl.
    CPC .......... *H04L 45/306* (2013.01); *H04L 67/568* (2022.05); *H04L 67/63* (2022.05); *H04W 76/12* (2018.02)

(56) References Cited

U.S. PATENT DOCUMENTS

| | | | |
|---|---|---|---|
| 2007/0214339 A1 | 9/2007 | Wooten | |
| 2008/0201772 A1 | 8/2008 | Mondaeev et al. | |
| 2008/0276091 A1 | 11/2008 | Welin et al. | |
| 2009/0052674 A1 | 2/2009 | Nishida et al. | |
| 2010/0177680 A1 | 7/2010 | Fischer et al. | |
| 2011/0202634 A1 | 8/2011 | Kovvali et al. | |
| 2011/0280143 A1 | 11/2011 | Li et al. | |
| 2011/0320592 A1* | 12/2011 | Kemmerer, Jr. | H04L 67/2852 709/224 |
| 2012/0011271 A1 | 1/2012 | Zhao et al. | |
| 2012/0284371 A1* | 11/2012 | Begen | H04N 21/222 709/219 |
| 2014/0185606 A1 | 7/2014 | Wei | |
| 2014/0233384 A1 | 8/2014 | Howard | |
| 2014/0247765 A1 | 9/2014 | Baghel et al. | |
| 2014/0341199 A1 | 11/2014 | Jeon et al. | |
| 2015/0026289 A1 | 1/2015 | Nordness et al. | |
| 2015/0117253 A1 | 4/2015 | Scott et al. | |
| 2015/0131668 A1 | 5/2015 | Kumar et al. | |
| 2015/0133049 A1 | 5/2015 | Lee et al. | |
| 2015/0358237 A1* | 12/2015 | Persson | H04W 40/02 370/235 |
| 2016/0142290 A1 | 5/2016 | Ren et al. | |
| 2016/0234331 A1 | 8/2016 | Childress et al. | |
| 2016/0255176 A1 | 9/2016 | Yamada | |
| 2016/0373409 A1 | 12/2016 | Zhu et al. | |
| 2018/0234346 A1 | 8/2018 | Liu et al. | |
| 2018/0234518 A1 | 8/2018 | Zhu et al. | |

FOREIGN PATENT DOCUMENTS

| | | |
|---|---|---|
| CN | 101399749 A | 4/2009 |
| CN | 101515944 A | 8/2009 |
| CN | 101540772 A | 9/2009 |
| CN | 101599895 A | 12/2009 |
| CN | 101924769 A | 12/2010 |
| CN | 102143126 A | 8/2011 |
| CN | 102204324 A | 9/2011 |
| CN | 102244900 A | 11/2011 |
| CN | 103379516 A | 10/2013 |
| CN | 104025016 A | 9/2014 |
| CN | 104113599 A | 10/2014 |
| CN | 104506637 A | 4/2015 |
| EP | 2768250 A1 | 8/2014 |
| KR | 20140083000 A | 7/2014 |
| KR | 20140135000 A | 11/2014 |
| WO | 2013052028 A2 | 4/2013 |
| WO | WO-2015121342 A1 | 8/2015 |

OTHER PUBLICATIONS

International Search Report issued in PCT/CN2015/086101 dated Aug. 5, 2015.

Jurga R.E., et al., "Technical Report—Packet Sampling for Network Monitoring", CERN, HP Procurve openlab project, Dec. 10, 2007, XP002788817, Retrieved from the Internet: URL:https://openlab-mu-internal.web.cern.ch/openlab-mu-internal/03_documents/3_technical_documents/techn... samplingreport.pdf [retrieved on Feb. 11, 2019], 18 pages.

Supplementary European Search Report—EP15900045—Search Authority—The Hague—Mar. 15, 2019.

Written Opinion issued in PCT/CN2015/086101 dated Aug. 5, 2015.

Li L E, et al., "Toward Software-Defined Cellular Networks", 2012 European Workshop on Software Defined Networking (EWSDN), Jan. 1, 2012 (Jan. 1, 2012), 6 Pages, XP055377899, DOI: 10.1109/EWSDN.2012.28 ISBN: 978-1-4673-4554-5.

3GPP TS 23.401, "3rd Generation Partnership Project, Technical Specification Group Services and System Aspects, General Packet Radio Service (GPRS) Enhancements for Evolved Universal Terrestrial Radio Access Network (E-UTRAN) Access (Release 10)", 3GPP TS 23.401, V10.13.0, Dec. 2014, pp. 1-278.

3GPP TS 36.321: "3rd Generation Partnership Project, Technical Specification Group Radio Access Network, Evolved Universal Terrestrial Radio Access (E-UTRA), Medium Access Control (MAC) Protocol Specification (Release 12)", 3GPP Standard, 3rd Generation Partnership Project (3GPP), Mobile Competence Centre, 650, Route Des Lucioles, F-06921 Sophia-Antipolis Cedex, France, vol. RAN WG2, No. V12.6.0, Jun. 30, 2015 (Jun. 30, 2015), pp. 1-77, XP050965799, [retrieved on Jun. 30, 2015] *chapters 3.2, 4.2.1, 4.4, 4.5, 5.7, 5.14, 5.15, 7.1*.

Cisco, "Cisco Visual Networking Index: Global Mobile Data Traffic Forecast Update, 2014-2019", White Paper, Feb. 3, 2015, pp. 1-42.

West M., et al., "TCP/IP Field Behavior", RFC 4413, Published Mar. 2006, pp. 1-44, retrieved from https://datatracker.ietf.org/doc/html/rfc4413.

Fielding R., et al., "Hypertext Transfer Protocol—HTTP/1.1," IETF RFC 2616, Revision 1.9, Jun. 1999, pp. 1-176.

\* cited by examiner

DEEP PACKET INSPECTION INDICATION FOR A MOBILE CDN

CROSS-REFERENCE TO RELATED APPLICATIONS

The present application is a continuation of U.S. Non-Provisional patent application Ser. No. 15/750,110, with a 371(c) date of Feb. 2, 2018, being a National Stage Entry of International Patent Application No. PCT/CN2015/086101, filed Aug. 5, 2015, each of which is hereby incorporated by reference herein in its entirety.

TECHNICAL FIELD

This application relates to wireless communication systems, and more particularly to providing an indication regarding whether deep packet inspection should be performed on any given packet in a content delivery network.

INTRODUCTION

Content delivery networks (CDNs) are network configurations that are used to push desired content (e.g., media of various types) to the nodes closest to the requesting users. This is done to reduce the traffic load on the backhaul links of the given network and speed up access times for the requesting users. When the network involves a mobile network, the mobile network below the packet data network (PDN) gateway (P-GW) is often treated essentially as a "black box," so that the P-GW is treated as the edge node for the CDN. This occurs even though the E-UTRAN NodeB (eNB) is actually the edge node for content requested by user equipment (UEs).

To address this issue, mobile CDNs have sought to cache the desired content inside of the mobile network, or below the P-GW such as at an intermediate node between the eNB and the P-GW. In order to properly route content requests between the cache inside the mobile network and any outside networks, the task of inspecting packets has been delegated to the eNB. Although this alleviates traffic on the backhaul link between the eNB and the P-GW, problems arise with respect to the processing load at the eNB. This is because the eNB typically must perform a deep packet inspection (DPI) of each packet that it receives on the uplink from attached UEs, regardless of whether the particular packets actually are requesting content of a type that has been cached inside the mobile network.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method comprises receiving, at a first device, a packet from a second device, the packet including a flag that specifies whether deep packet inspection (DPI) should be performed on the packet. The method further comprises checking, by the first device, the flag included in the packet. The method further comprises performing, by the first device, DPI of the packet to obtain content information in response to determining the flag as specifying that the DPI should be performed on the packet.

In an additional aspect of the disclosure, a method comprises generating, by a first device, a packet as part of an uplink request. The method further comprises determining, by the first device, whether the packet includes a request for a predetermined type of content. The method further comprises inserting, in the packet of the uplink message, a deep packet inspection (DPI) flag to specify that DPI should be performed on the packet, in response to determining the packet includes the request for the predetermined type of content. The method further comprises transmitting the packet to a second device.

In an additional aspect of the disclosure, an apparatus includes a transceiver configured to receive a packet from a separate device, the packet including a flag that specifies whether deep packet inspection (DPI) should be performed on the packet. The apparatus further includes an inspection module configured to check the flag included in the packet; and perform DPI of the packet to obtain content information in response to determining the flag as specifying that the DPI should be performed on the packet. The apparatus further includes a processor configured to execute the inspection module.

In an additional aspect of the disclosure, an apparatus includes a processor configured to generate a packet as part of an uplink request. The apparatus further includes a flag insertion module configured to determine whether the packet includes a request for a predetermined type of content. The flag insertion module is further configured to insert, in the packet of the uplink message, a deep packet inspection (DPI) flag to specify that DPI should be performed on the packet, in response to determining the packet includes the request for the predetermined type of content. The apparatus further includes a transceiver configured to transmit the packet to a separate device, wherein the processor is further configured to execute the flag insertion module.

In an additional aspect of the disclosure, a computer-readable medium having program code recorded thereon includes program code comprising code for causing a first device to receive a packet from a second device, the packet including a flag that specifies whether deep packet inspection (DPI) should be performed on the packet. The computer-readable medium further includes code for causing the first device to check the flag included in the packet. The computer-readable medium further includes code for causing the first device to perform DPI of the packet to obtain content information in response to determining the flag as specifying that the DPI should be performed on the packet.

In an additional aspect of the disclosure, a computer-readable medium having program code recorded thereon includes program code comprising code for causing a first device to generate a packet as part of an uplink request. The computer-readable medium further includes code for causing the first device to determine whether the packet includes a request for a predetermined type of content. The computer-readable medium further includes code for causing the first device to insert, in the packet of the uplink message, a deep packet inspection (DPI) flag to specify that DPI should be performed on the packet, in response to determining the packet includes the request for the predetermined type of content. The computer-readable medium further includes code for causing the first device to transmit the packet to a second device.

In an additional aspect of the disclosure, an apparatus includes means for receiving a packet from a separate device, the packet including a flag that specifies whether deep packet inspection (DPI) should be performed on the packet. The apparatus further includes means for checking the flag included in the packet. The apparatus further includes means for performing DPI of the packet to obtain content information in response to determining the flag as specifying that the DPI should be performed on the packet.

In an additional aspect of the disclosure, an apparatus includes means for generating by the apparatus, a packet as part of an uplink request. The apparatus further includes means for determining, by the apparatus, whether the packet includes a request for a predetermined type of content. The apparatus further includes means for inserting, in the packet of the uplink message, a deep packet inspection (DPI) flag to specify that DPI should be performed on the packet, in response to determining the packet includes the request for the predetermined type of content. The apparatus further includes means for transmitting the packet to a separate device.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
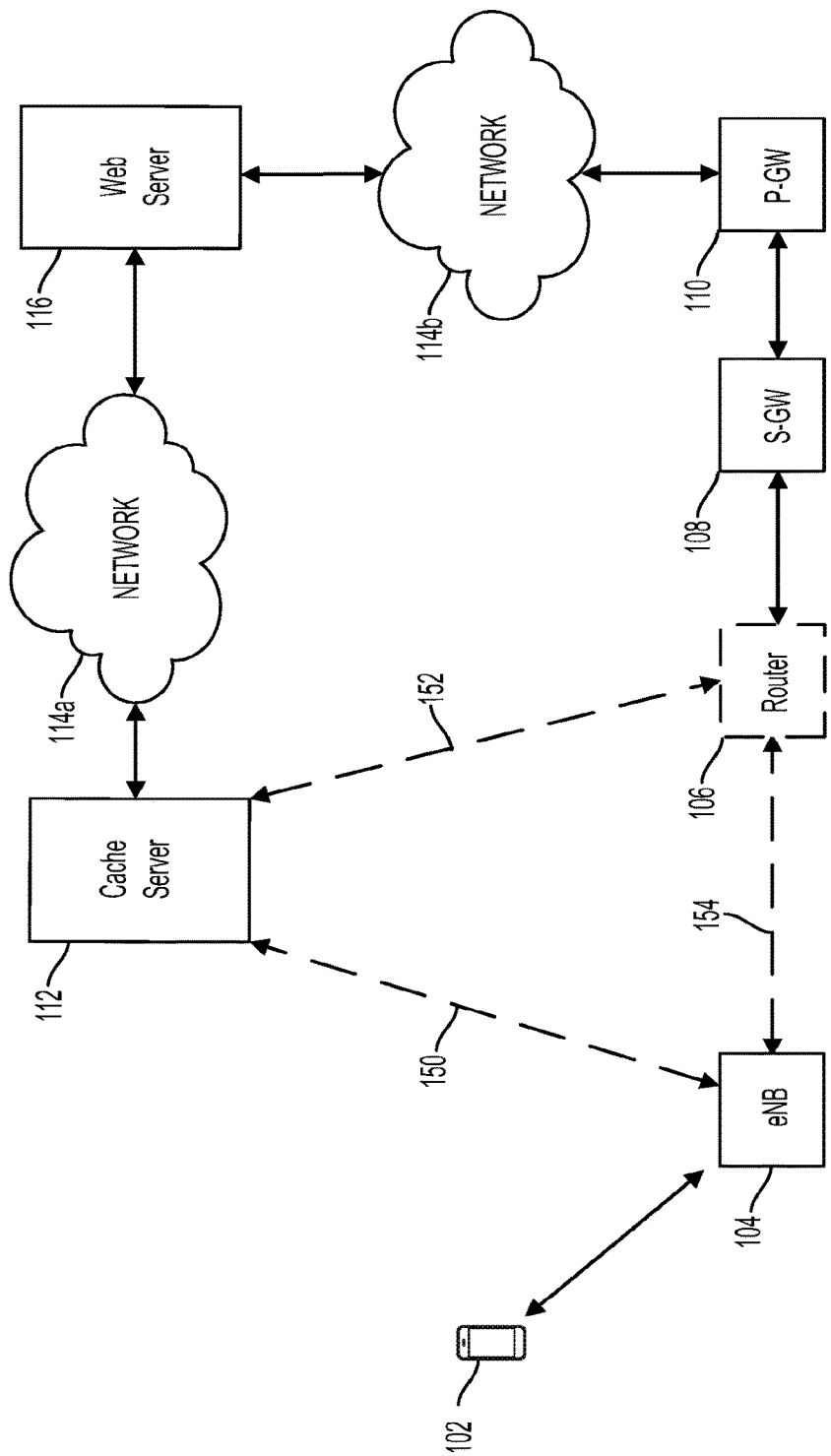
FIG. 1 illustrates a mobile content delivery network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Embodiments of the present disclosure introduce systems and techniques to speed up the provision of various types of content to requesting devices while also reducing the workload on a base station, such as an eNodeB, when routing content requests. In an embodiment, content (such as that which is part of a CDN) may be cached at a proxy server (also referred to as a cache server herein) that is located below the P-GW of the mobile network. To reduce the workload at the eNodeB so that not every packet must be inspected before choosing to route to the cache server or not, embodiments of the present disclosure include a flag in those uplink packets that should be routed to the cache server.

For example, a UE may send a content request in an uplink packet. In an embodiment, the flag may be set (to indicate that DPI should be performed on the packet) based on specific types of content (e.g., for content associated with video or some other type of media) and/or on specific protocols (e.g., HTTP, FTP, WDP, etc.). The base station checks the flag to determine whether DPI should be performed. If the flag is not set in any given packet, then that given packet is forwarded to the P-GW of the mobile network (and from there to the original destination specified in the packet) without DPI being performed or the packet being routed to the cache server. On the other hand, if the flag has been set in the packet then the base station performs DPI and determines how to specially route the packet to potentially obtain the content from a cache server instead of the original destination.

In an embodiment, the base station includes routing capability according to one or more routing protocols (e.g., WCCP). In response to identifying a packet whose flag has been set, and performing DPI on the packet, the base station may establish a connection with the cache server (e.g., by establishing a tunnel or by L2 redirection). The base station re-routes the packet to the cache server by the established connection and receives content back from the cache server via the same connection. In another embodiment, the base station does not include the routing capability. Instead, the base station adds an indication to an extension header for the packet where the flag has been set and sends the packet with extension header to an intermediate node, referred to herein as a router (such as a WCCP router). The router performs DPI and establishes a tunnel (or L2 redirection) to the cache server. The router re-routes the packet to the cache server by the established connection and receives content back from the cache server via the same connection. The content is then sent back to the UE.

When the cache server receives a content request, the cache server first checks its local cache to determine whether the content has already been cached locally. If the content has already been cached (e.g., from being requested previously or under direction of the operator of a CDN), then the cache server retrieves the content from the local cache and sends it back to the base station or router via the same established connection. If the cache server has not previously cached the content, then the cache server establishes its own connection to a network to access the content at the originally-specified destination (e.g., a web server). Once the cache server receives the content, the cache server may then cache it locally as it forwards it back to the UE. When the cache server sends the content back to the UE (whether the content was obtained locally or from the web server), the cache server identifies the source address as that of the original destination of the uplink packet, therefore rendering the operation transparent to the UE while enabling the cache server to take ownership of the content requests associated with specified content and/or protocol types.

FIG. 1 illustrates a wireless communication network 100, in accordance with various aspects of the present disclosure. The wireless network 100 may include a number of base stations 104. A base station 104 may include an evolved Node B (eNodeB) in the LTE context, for example. A base station may also be referred to as a base transceiver station or an access point. For simplicity of discussion, it will be referred to herein as a base station. It will be recognized that there could be one to many base stations 104, as well as be an assortment of different types such as macro, pico, and/or femto base stations, though just one base station 104 is illustrated for simplicity of discussion.

The base station 104 communicates with user equipment (UEs) 102 as shown. For example, the base station 104 may communicate with UEs 102 that are within the cell associated with the base station 104. The UE 102 may communicate with the base station 104 via an uplink and a downlink. The downlink (or forward link) refers to the communication link from a base station 104 to a UE 102. The uplink (or reverse link) refers to the communication link from a UE 102 to a base station 104.

UEs 102 may be dispersed throughout the wireless network 100, and each UE 102 may be stationary or mobile. A UE 102 may also be referred to as a terminal, a mobile station, a subscriber unit, etc. A UE 102 may be a cellular phone, a smartphone, a personal digital assistant, a wireless modem, a laptop computer, a tablet computer, etc. The wireless communication network 100 is one example of a network to which various aspects of the disclosure apply.

Also illustrated in FIG. 1 are additional user plane nodes including a serving gateway (S-GW) 108 and a packet data network gateway (P-GW) 110. These user plane nodes may be part of a serving network (also referred to as a core network), such as an evolved packet core (EPC). As will be recognized, the serving network may include many other network elements that are not shown in FIG. 1 for simplicity of discussion of various aspects of the present disclosure.

The S-GW 108 may be the gateway that terminates the interface towards the base station 104, assists in inter-base station handover, and provides mobility anchoring for mobility between different standards (e.g., 2G, 3G, 4G, LTE, etc.), lawful interception, packet-based routing and forwarding, and accounting for inter-operator charging to name just a few examples. The S-GW 108 routes and forwards data packets from the UE 102, for example, to the P-GW 110. FIG. 1 illustrates a single P-GW 110 for sake of simplicity, though it will be recognized that there are multiple external networks to which data may be directed, where network 114b is just one example. The P-GW 110 provides connectivity between the serving network and external packet data networks (such as the network 114b as the point of exit and entry for data traffic from/to the UE 102. The P-GW 110 may be involved in per-user based packet filtering, lawful interception, service level gating control, service level rate enforcement, and packet screening to name just a few examples.

Previously, when the UE 102 requested content (e.g., video, audio, text, or similar/other types of media) from some source in an external network, such as a web server 116, the request would be included in one or more packets at the UE 102 and sent to the base station 104. The base station 104 would forward the one or more packets along on the user plane to the P-GW 110, where the P-GW 110 would select the proper network, for example network 114b, by which the enable the one or more packets to reach the web server 116. In an effort to speed up media access, a cache server 112 is provided within the serving (mobile) network, e.g. below the P-GW 110. The cache server 112 may include at least one computing system, for example as discussed below with respect to FIG. 4. While the cache server 112 is referred to as a singular entity, the cache server 112 may include any number of computing devices and may range from a single computing system to a system cluster of any size.

The cache server 112 may be used to cache content (e.g., video, audio, text, etc.) that may have been previously requested or which may be anticipated to be requested by one or more UEs 102, for example as part of a content delivery network (CDN). As a result, when one or more UEs 102 request content that is cached at the cache server 102, the content may be served from the cache server 112 to reduce the load on the backhaul to the P-GW 110 and beyond. This may result in an improved user experience for the user of the UEs 102, for example by reducing delay and reducing a playout interruption probability. Further, cache server 112 may operate as a transparent proxy, such that returned content appears to have been delivered from the originally intended address.

Previously, the base station 104 may be responsible for inspecting (e.g., by deep packet inspection or DPI) every packet arriving from attached UEs 102 on the uplink in order to determine whether the packet includes a request for content that has already been cached at the cache server 112. This imposes a heavy load on the base station 104 as it performs DPI on every uplink packet.

According to embodiments of the present disclosure, this load on the base station 104 is enabled to be significantly reduced with the introduction of a DPI indicator, such as a DPI flag, that is set by the requesting UE 102 in uplink packets received by the base station 104. For simplicity, reference will be made herein to a DPI flag as an example of the DPI indicator. The UE 102 may set a DPI flag, for example in an application layer, before transmitting the packet or packets on the uplink to the base station 104. In alternative embodiments, the DPI flag may be set on other protocol layers such as RLC or MAC. The DPI flag may be associated with a variety of types of content and/or service. For example, the DPI flag may be associated with certain types of streaming services or protocols, such as HTTP streaming (e.g., with an HTTP GET request) or WDP streaming, or with FTP operations. In other embodiments, the DPI flag may be associated with certain types of content, such as streaming video or streaming audio, to name just two examples. As will be recognized, a UE 102 may send any number of packets for one or more requests for content. For simplicity of discussion, the following will focus on how a given packet may be handled.

In an embodiment, the base station 104 receives the packet on the uplink from the UE 102. The base station 104 checks the DPI flag to determine whether it has been set. If the DPI flag has not been set, then the base station 104 forwards the packet along the regular channels in the user plane (e.g., S-GW 108 and P-GW 110) for transmission to the proper network and destination, all without the base station 104 having performed DPI on the packet. If the DPI flag has been set, the base station 104 performs DPI on the packet to determine whether the requested content is the type of content that would be cached at the cache server 112 (in some embodiments, where the required protocol for the packet exceeds a capability of the base station 104, the base station 104 may request an external node such as the S-GW 108 or P-GW 110 (to name a few examples) to perform DPI on the packet). In this embodiment, the base station 104 additionally operates as a router, such as in accordance with a content routing protocol that redirects traffic flows from UEs 102 to the cache server 112. An example of a web content routing protocol is the web cache communication protocol (WCCP), though others may also be possible as will be recognized.

If the base station 104 determines that the requested content a type of content that may be cached at the cache server 112 (e.g., it is within a designated address range and/or a designated port), the base station 104 may route the packet containing the request to the cache server 112. To do this, the base station 104 may establish a tunnel with the cache server 112, such as a generic routing encapsulation (GRE) tunnel to name just one example, illustrated in FIG. 1 as tunnel 150. The tunnel 150 may be a GRE tunnel, for example, where the cache server 112 is on another subnet so that the original packet from the UE 102 is not changed in the forwarding. Where that is not the case (the cache server 112 is not on another subnet), the base station 104 may alternatively route the packet to the cache server 112 via L2 redirection.

When the packet reaches the cache server 112 from the tunnel 150, the cache server 112 proceeds with fetching the requested content specified in the packet. For example, where the cache server 112 already has the desired content cached locally, the cache server 112 fetches the content from the local cache. Where the cache server 112 does not have the content cached locally (e.g., where the cache server 112 has not served the content before or the content provider has not sent it there yet), the cache server 112 may, itself, reach out to the relevant network (illustrated as network 114a, which may be the same or a different network as the network 114b in FIG. 1) to access the web server 116 where the packet was initially addressed and intended to go. In this situation, the cache server 112 may now cache the content after receiving it from the web server 116 (or may not, depending upon the specified desire of the owner or operator of the content and/or the cache server 112).

Either way, once the cache server 112 has the requested content it sends it back to the base station 104 via the tunnel 150. In doing so, the cache server 112 sends the content back to the base station 104 with a source address (such as IP address) of the original destination of the packet (web server 116), not an address of the cache server 112. In this way, the operation of the cache server 112 is transparent to the UE 102 since the UE 102 does not know that the content it is being served was provided by a local cache instead of the originally intended source. The tunnel 150 may be deleted after the expiration of a timeout period.

In an alternative embodiment, the base station 104 receives the packet on the uplink from the UE 102. The base station 104 checks the DPI flag to determine whether it has been set. If the DPI flag has not been set, then the base station 104 forwards the packet along the regular channels in the user plane (e.g., S-GW 108 and P-GW 110) for transmission to the proper network and destination, all without the base station 104 having performed DPI (or other related operations) on the packet. If the DPI flag has been set, instead of the base station 104 performing DPI as discussed above, the base station 104 forwards the packet to another intermediate node in the network, illustrated as router 106 in FIG. 1, via interface 154.

For example, where the base station 104 determines that the DPI flag in the packet has been set, the base station 104 does not perform DPI but instead may set a corresponding flag in an extension header (e.g., in bits that have been designed for use as a DPI flag according to embodiments of the present disclosure) and associate the extension header with the packet. In an embodiment, the extension header may be a GPRS tunneling protocol (GTP-U) extension header. The base station 104 then sends modified packet with extension header on to the router 106, for example via the S1-U user plane interface.

The router 106 may be a standalone node (e.g., dedicated hardware and/or software) or may be integrated with another network node. The router 106 is configured to be able to comprehend the extension header (e.g., GTP-U) used to convey the corresponding flag on to the router 106 as well as operate in accordance with a content routing protocol such as WCCP as discussed above. The router 106 detects the corresponding flag in the extension header and performs DPI of the packet from the UE 102. If the router 106 determines that the requested content a type of content that may be cached at the cache server 112, the router 106 may route the packet containing the request to the cache server 112 via tunnel 152, which may be for example a GRE tunnel or a L2 redirect. When the packet reaches the cache server 112 from the tunnel 150, the cache server 112 proceeds with fetching the requested content specified in the packet as discussed above (e.g., either from local cache or from the web server 116).

Once the cache server 112 has the requested content, the cache server 112 sends it back to the router 106 via the tunnel 152 with the source address of the original destination (so that the cache server 112 is transparent to the UE 102). The router 106, in turn, sends the content on to the base station 104 via the interface 154 for subsequent transmission on to the UE 102. The tunnel 152 may similarly be deleted after the expiration of a timeout period. Under any of the embodiments, when UE 102 transitions from the current base station 104 to another base station 104 due to mobility of the UE 102, the retrieved content data may be forwarded to the new base station 104 to reach the UE 102, for example according to currently existing or new forms of direct or indirect data forwarding. The data forwarding tunnel may then be deleted after the expiration of a timeout period. In this manner, embodiments of the present disclosure may reduce the impact on the functionality of legacy 3GPP networks.

The discussion herein focuses on communications between a UE, such as UE 102, and a base station 104. As will be recognized, however, the UE 102 and the base station 104 are representative of several different types of devices that may also implement aspects of the present disclosure. For example, embodiments of the present disclosure may also be implemented in a cloud access network (such as a cloud radio access network (cloud RAN)) architecture, where one node of the cloud access network sets the flag and another node in the network detects the flag and routes the packet accordingly (either to a cache server or to the P-GW and regular outside network). For simplicity, discussion herein is with respect to the UE 102/base station 104 relationship to demonstrate aspects of the present disclosure.

Figure 2:
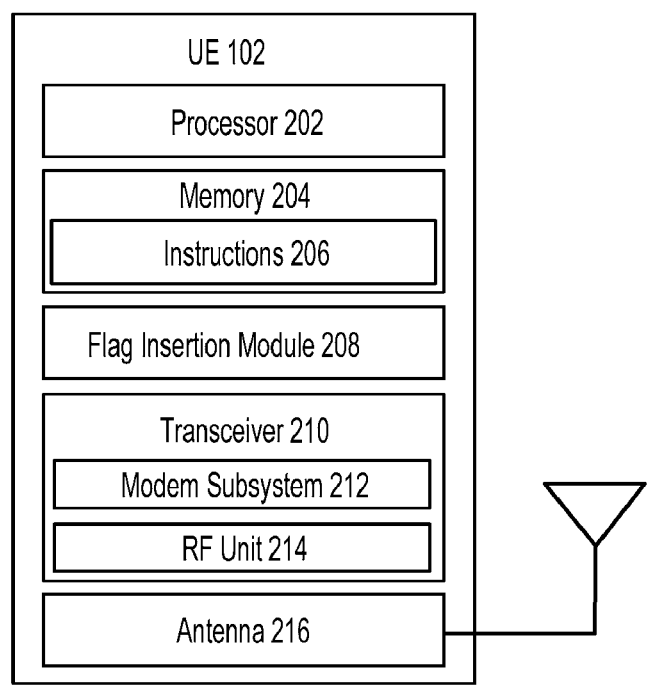
FIG. 2 is a block diagram illustrating an exemplary user equipment in accordance with various aspects of the present disclosure.

Turning now to FIG. 2, is a block diagram is illustrated of an exemplary UE 102 according to embodiments of the present disclosure. The UE 102 may include a processor 202, a memory 204, a flag insertion module 208, a transceiver 210, and an antenna 216. These elements may be in direct or indirect communication with each other, for example via one or more buses. As mentioned above with respect to FIG. 1, the UE 102 may communicate with one or more base stations 104.

The processor 202 may include a CPU, a DSP, an ASIC, a controller, a FPGA device, another hardware device, a firmware device, or any combination thereof configured to perform the operations described herein with reference to the base station 110 introduced in FIG. 1 above. The processor 202 may also be implemented as a combination of computing devices, e.g., a combination of a DSP and a microprocessor, a plurality of microprocessors, one or more microprocessors in conjunction with a DSP core, application specific integrated processors (ASICs), or any other such configuration.

The memory 204 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UE 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The flag insertion module 208 of the UE 102 may be used for various aspects of the present disclosure. For example, the flag insertion module 208 may be used to determine whether any particular packet should have a DPI flag set or not. For example, the flag insertion module 208 may have access to a list or database of protocols, content types, etc. for which a cache server (such as cache server 112) has been selected to provide cache service for (e.g. for one or more CDNs). The flag insertion module 208 may, itself, cause the DPI flag to be set in a packet or it may instruct a modem of the transceiver 210 to set the DPI flag for the relevant packets. Thus, when a packet includes a request for content that should be routed to the cache server 112 of FIG. 1, the flag insertion module 208 detects this and either sets a flag itself or instructs the modem to set the flag. In an embodiment, the flag insertion module 208 may be executed by the processor 202 or may alternatively be a hardware module.

Figure 5:
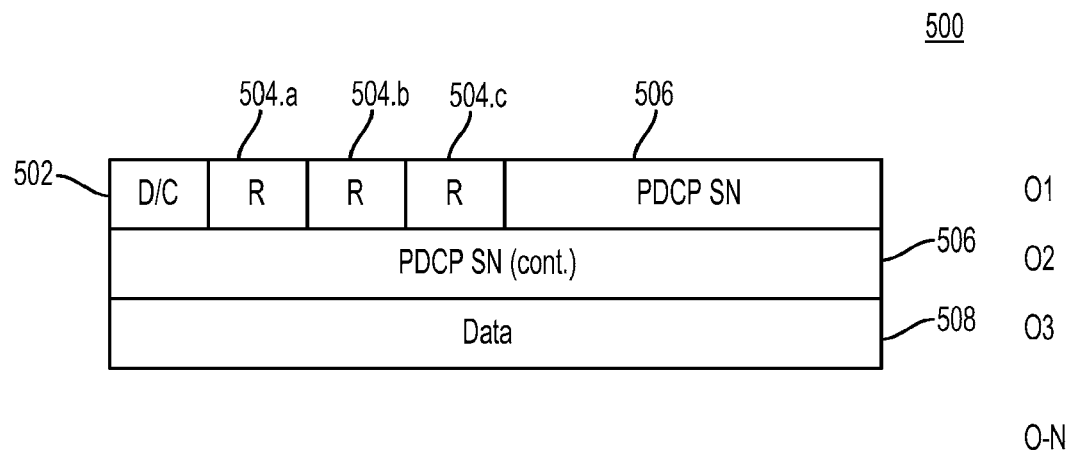
FIG. 5 illustrates an exemplary header configuration according to aspects of the present disclosure.

The several different ways in which the DPI flag may be set. For example, FIG. 5 illustrates an exemplary header configuration 500 according to aspects of the present disclosure. Specifically, FIG. 5 illustrates an uplink packet data convergence protocol (PDCP) protocol data unit (PDU) 500 in which certain bits may be used for flag indication. As illustrated, the PDCP PDU 500 is an octet-aligned bit string. The PDCP PDU 500 may include a D/C field 502 (D referring to user-plane data and C referring to control information from a PDCP layer) that may carry user plane information, multiple reserved fields 504.a, 504.b, and 504.c, a PDCP sequence number (SN) 506, all in a first octet O1. A second octet O2 may include a continuation of the PDCP SN 506, and a third octet O3 may include data, which may continue for as many octets (e.g., octet O-N) as the data requires.

The reserved fields 504.a-504.c, which may each be a bit in length, may be utilized according to aspects of the present disclosure to carry DPI flag information. Accordingly, the base station 104 may be modified to detect these bits and associate it with DPI, instead of just ignoring these bits. For example, all three of reserved fields 504.a-504.c may be used, such as setting each to 1 so there is a sequence of 111, in order to "set" the flag to indicate that DPI should be performed. As will be recognized, any other distinct bit pattern may alternatively be used to indicate to the base station 104 that DPI should be performed, so long as both the UE 102 and the base station 104 are apprised of the unique sequence and associated meaning. The flag insertion module 208 of FIG. 2 may determine to set the DPI flag in reserved fields 504.a-504.c, and either do so or instruct the modem to do so in the actual packet. For example, the DPI flag may be set to PDCP packets that intended to be TCP port 80 traffic. Other protocols and ports are also possible, as will be recognized.

Figure 6:
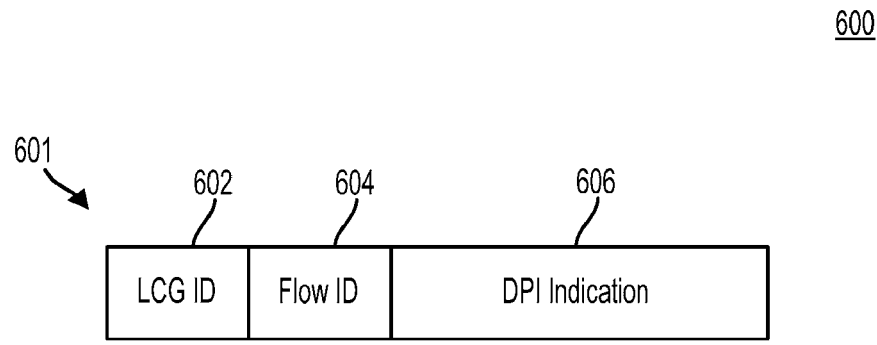
FIG. 6 illustrates an exemplary control element according to aspects of the present disclosure.

As another example of setting a DPI flag, FIG. 6 illustrates an exemplary control element 600 used as a DPI flag according to aspects of the present disclosure. In FIG. 6, instead of utilizing reserved bits in a PDCP PDU, the flag insertion module 208 may utilize a new MAC control element (CE) 601 to carry uplink DPI flag information.

The PDCP PDU 601 may include a logical channel group (LGC) ID field 602, which may identify the group of logical channels (one or more) for which the DPI flag may be set. In an embodiment, the length of this field may be 2 bits. The PDCP PDU 601 may also include a flow ID field 604, which may be used to identify which flow of the logical channel has the DPI flag (or indication) set. In an embodiment, the length of this field may also be 2 bits. Further, the PDCP PDU 601 may include a DPI indication field 606. The DPI indication field 606 includes the DPI flag which is used to signal whether the base station 104 should perform DPI or not on the corresponding packet.

The MAC CE 601 may be included in the PDU of the data radio bearer (DRB) that is tasked with carrying the associated uplink application layer message (the "packet" referred to above, such as an HTTP get request to name an example).

Figure 7:
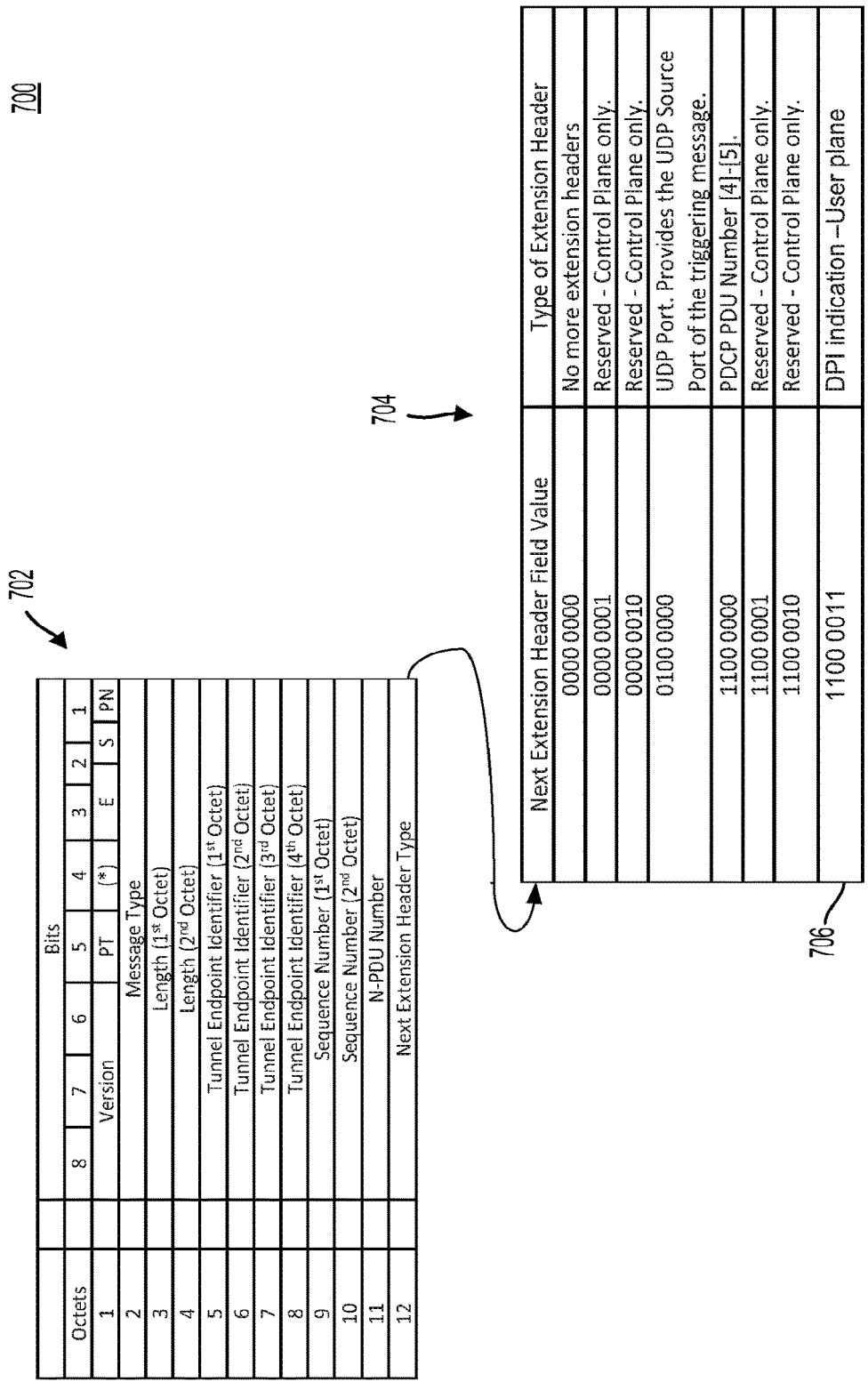
FIG. 7 illustrates an exemplary header configuration according to aspects of the present disclosure.

As another example, FIG. 7 illustrates an exemplary header configuration 700 according to aspects of the present disclosure. The exemplary header configuration 700 is useful, for example, for base stations 104 in embodiments where another router 106 is used for DPI and routing to the cache server 112. As part of the exemplary header configuration 700, FIG. 7 illustrates an outline of a GTP-U header 702 and a list of definitions 704. Of particular note is the 12th octet of the GTP-U header 702 that contains information about the next extension header type.

In the list of definitions 704 of the next extension header type, a new field value 706 may be added that is used to indicate DPI, thus be used as a DPI flag. As illustrated in FIG. 7, this new field value 706 is listed as 11000011, although as will be recognized other field values may be used instead so long as both the UE 102, the base station 104, and the router 106 are apprised of the unique sequence and associated meaning. In use, when the base station 104 receives an uplink packet from a UE 102 in embodiments where the base station 104 forwards packets to the router 106 for DPI and routing, the base station 104 does not interpret data associated with the TCP/IP layer and above but instead focuses on the DPI flag. If the DPI flag is set, the base station 104 propagates the DPI flag by setting the next extension header type to the new field value 706 and then proceeds with transmitting the packet to the router 106 on the interface 154.

As part of this, the base station 104 may set the E flag in the GTP-U header 702 (in octet 1) to 1, the S flag to 0, and define the next extension header type as stated above.

Returning to FIG. 2, the transceiver 210 may include a modem subsystem 212 and a radio frequency (RF) unit 214. The transceiver 210 is configured to communicate bi-directionally with other devices, such as a base station 104. The modem subsystem 212 may be configured to modulate and/or encode data according to a modulation and coding scheme (MCS), e.g., a low-density parity check (LDPC) coding scheme, a turbo coding scheme, a convolutional coding scheme, etc.

The RF unit 214 may be configured to process (e.g., perform analog to digital conversion or digital to analog conversion, etc.) modulated/encoded data from the modem subsystem 212 (on outbound transmissions) or transmissions originating from another external source such as a base station 104. Although shown as integrated together in transceiver 210, the modem subsystem 212 and the RF unit 214 may be separate devices that are coupled together at the UE 102 to enable the UE 102 to communicate with other devices.

The RF unit 214 may provide the modulated and/or processed data, e.g. data packets, to the antenna 216 for transmission to one or more other devices such as a base station 104. After the transceiver 210 receives the packet information with the DPI flag set (or not set) from the flag insertion module 208, the modem subsystem 212 may modulate and/or encode the packet information in preparation for transmission. The RF unit 214 may receive the modulated and/or encoded data packet and process the data packet prior to passing it on to the antenna 216. This may include, for example, transmission of the encoded data packet with the DPI flag set or not set to the base station 104. The antenna 216 may further receive data messages transmitted from the base station 104 and provide the received data messages for processing and/or demodulation at the transceiver 210 (e.g., the requested content in response to the request in the data packet). As illustrated, antenna 216 may include multiple antennas of similar or different designs in order to sustain multiple transmission links.

Figure 3A:
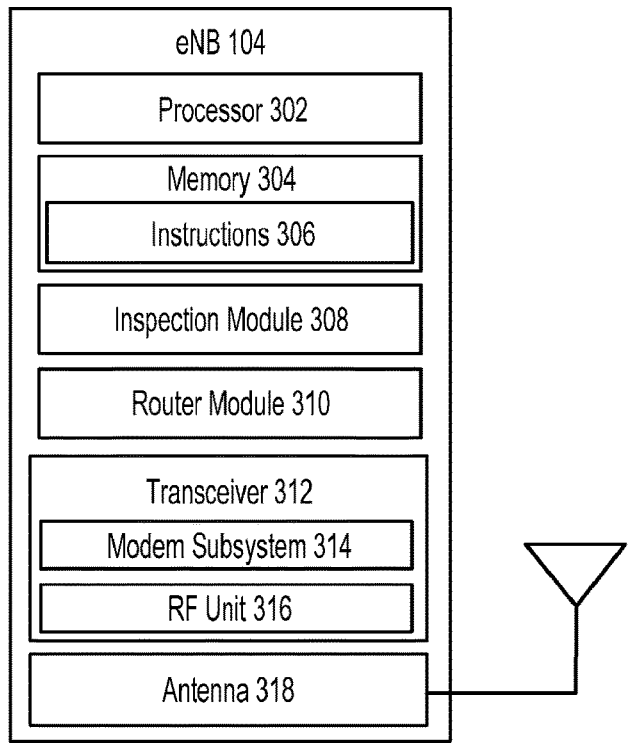
FIG. 3A is a block diagram illustrating an exemplary base station in accordance with various aspects of the present disclosure.

FIG. 3A is a block diagram of an exemplary base station 104 according to embodiments of the present disclosure. Specifically, the base station 104 illustrated in FIG. 3A may be used in embodiments described above with respect to FIG. 1 where the base station 104 may perform DPI and routing functions. The base station 104 may include a processor 302, a memory 304, an inspection module 308, a router module 310, a transceiver 312, and an antenna 318. These elements may be in direct or indirect communication with each other, for example via one or more buses. As mentioned above with respect to FIG. 1, the base station 104 may communicate with a UE 102 that is within range.

The processor 302 may include a CPU, a DSP, an ASIC, a controller, a FPGA device, another hardware device, a firmware device, or any combination thereof configured to perform the operations described herein with reference to the base station 104 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the base station 104 in connection with embodiments of the present disclosure. Instructions 306 may also be referred to as code, which may be interpreted broadly to include any type of computer-readable statement(s) as discussed above with respect to FIG. 2.

The transceiver 312 may include a modem subsystem 314 and a radio frequency (RF) unit 316. The transceiver 312 is configured to communicate bi-directionally with other devices, such as one or more UEs 102. Further, the transceiver 312 is configured to communicate with other network nodes, such as the S-GW 108, P-GW 110, and the cache server 112 illustrated in FIG. 1 (as well as other network elements).

The modem subsystem 314 may be configured to modulate and/or encode data according to a modulation and coding scheme (MCS), e.g., a low-density parity check (LDPC) coding scheme, a turbo coding scheme, a convolutional coding scheme, etc. The RF unit 316 may be configured to process (e.g., perform analog to digital conversion or digital to analog conversion, etc.) modulated/encoded data from the modem subsystem 314 (on outbound transmissions) or transmissions originating from another external source such as a UE 102. Although shown as integrated together in transceiver 312, the modem subsystem 314 and the RF unit 316 may be separate devices that are coupled together at the base station 104 to enable the base station 104 to communicate with other devices.

The RF unit 316 may provide the modulated and/or processed data, e.g. data packets, to the antenna 318 for transmission to one or more other devices such as a UE 102, such as transmitting the requested content. As illustrated, antenna 318 may include multiple antennas of similar or different designs in order to sustain multiple transmission links. In the other direction, after the transceiver 312 receives a modulated data packet from a UE 102 via the antenna 318, the modem subsystem 314 and RF unit 316 may demodulate and/or decode some portion of the packet information, for example accessing the DPI flag instead of performing DPI on the packet.

The inspection module 308 may be used to look at select aspects of an uplink packet after it has been demodulated and processed by the transceiver 312. For example, according to embodiments of the present disclosure where the base station 104 is set up to perform DPI and establish the tunnel 150 with the cache server 112, the base station 104 may inspect the received packet for the DPI flag. If the DPI flag is not set, the inspection module 308 may allow the base station 104 to forward the packet on to the rest of the service network (e.g., the P-GW 110) without routing to the cache server 112. If the inspection module 308 determines that the DPI flag is set in the packet, the inspection module 308 may perform DPI on the packet based on the DPI indication. As a result of the DPI performed, the inspection module 308 may refer the packet to the router module 310. The router module 310 may be used to establish the tunnel 150 (e.g., GRE tunnel or L2 redirect) with the cache server 112 and instruct the transceiver 312 to forward the packet whose DPI flag was set to the cache server 112 via the tunnel 150.

In an embodiment, the inspection module 308 and the router module 310 may each be executed by the processor 302 or may alternatively be hardware modules; further, the respective modules may be separate and distinct from each other or be subsets of an overall software or hardware module. Thus, the base station 104 of FIG. 3A may both perform DPI and function as a router, such as a WCCP router, to handle content requests for content that is already or may be cached at the cache server 112.

Figure 3B:
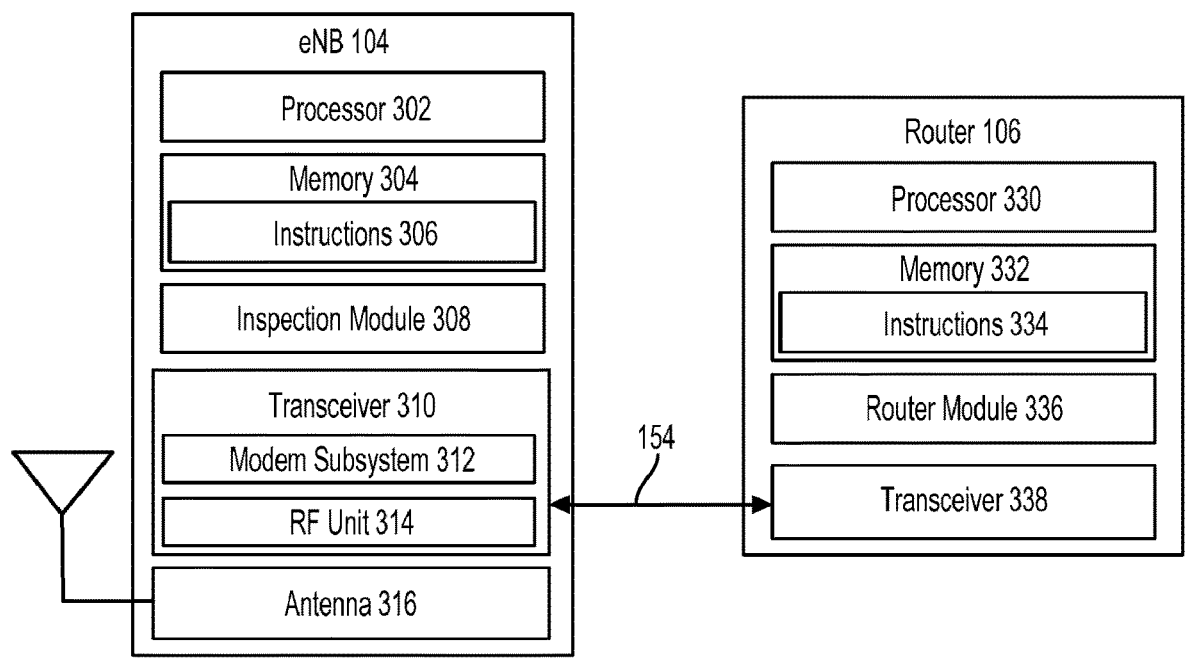
FIG. 3B is a block diagram illustrating an exemplary base station and router in accordance with various aspects of the present disclosure.

Turning now to the alternative embodiment of FIG. 3B, is a block diagram is illustrated of an exemplary base station 104 and router 106 in accordance with various aspects of the present disclosure. Specifically, FIG. 3B illustrates embodiments where the base station 104 may limit its involvement with DPI to checking the DPI flag in uplink packets and forwarding those packets whose flags have been set to another router 106 for communication with the cache server 112. The base station 104 may include a processor 302, a memory 304, an inspection module 308, a transceiver 310, and an antenna 316. The processor 302, memory 304, transceiver 310, and antenna 316 may all be as described above with respect to FIG. 3A. These elements may be in direct or indirect communication with each other, for example via one or more buses. Discussion with respect to FIG. 3B will focus on those aspects that differ from what was discussed above with respect to FIG. 3A.

The inspection module 308 in FIG. 3B may be used to look at select aspects of an uplink packet after it has been demodulated and processed by the transceiver 312. For example, in the embodiments associated with FIG. 3B, the inspection module 308 of base station 104 may inspect the received packet for the DPI flag. As stated above with respect to FIG. 7, the base station 104 may refrain from analyzing/interpreting the TCP/IP layer and above layers' messaging but instead focus on the DPI flag (e.g., as set in a PDCP PDU header or MAC CE, to name just two examples). If the DPI flag is not set, the inspection module 308 may allow the base station 104 to forward the packet on to the rest of the service network (e.g., the P-GW 110) without further treatment with respect to the cache server 112.

If the inspection module 308 determines that the DPI flag is set in the packet, the inspection module 308 may cause the base station 104 to transmit the packet to the router 106 via the transceiver 310. As part of this operation, the inspection module 308 may further add an indication of the DPI flag to an extension header, such as the GTP-U extension header discussed above with respect to FIG. 7. The transceiver 310 may then transmit the packet with the extension header to the router 106, for example via the interface 154.

The router 106 may be integrated with another network node element or be a standalone network node element, as will be recognized. The router 106 may include a processor 330, a memory 332, a router module 336, and a transceiver 338. The processor 330 may include a CPU, a DSP, an ASIC, a controller, a FPGA device, another hardware device, a firmware device, or any combination thereof configured to perform the operations described herein with reference to the router 106 introduced in FIG. 1 above. The processor 330 may also be implemented as a combination of computing devices, e.g., a combination of a DSP and a microprocessor, a plurality of microprocessors, one or more microprocessors in conjunction with a DSP core, or any other such configuration.

The memory 332 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 332 includes a non-transitory computer-readable medium. The memory 332 may store instructions 334. The instructions 334 may include instructions that, when executed by the processor 330, cause the processor 330 to perform the operations described herein with reference to the router 106 in connection with embodiments of the present disclosure. Instructions 406 may also be referred to as code, which may be interpreted broadly to include any type of computer-readable statement(s) as discussed above with respect to FIG. 2.

The transceiver 338 may be, for example, an Ethernet connection, a WiFi connection, or any other connection that enables the router 106 to transmit and receive data to and from the base station 104 via the interface 154, any other network node elements such as the S-GW 108 and/or P-GW 110, as well as to establish tunnel 152 with the cache server 112.

The router module 336 may be used to cause the router 106 to perform the DPI in response to detecting that the DPI indication has been set in the GTP-U extension header. In response to performing the DPI, the router module 336 may cause the transceiver 338 to establish the tunnel 152 (e.g., GRE tunnel or L2 redirect) with the cache server 112 and instruct the transceiver 338 to forward the packet whose DPI flag was set to the cache server 112 via the tunnel 152.

Figure 4:
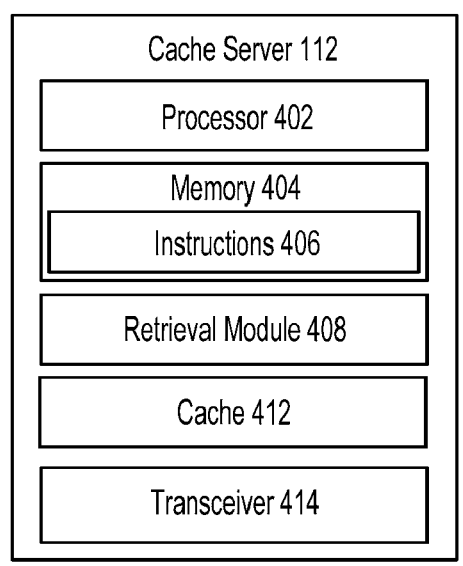
FIG. 4 illustrates an exemplary cache server according to aspects of the present disclosure.

FIG. 4 illustrates an exemplary cache server 112 according to aspects of the present disclosure. The cache server 112 may communicate with base stations 104 and/or routers 106, for example via one or more tunnels established with the respective network node elements.

The processor 402 may include a CPU, a DSP, an ASIC, a controller, a FPGA device, another hardware device, a firmware device, or any combination thereof configured to perform the operations described herein with reference to the cache server 112 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the cache server 112 in connection with embodiments of the present disclosure. Instructions 406 may also be referred to as code. Instructions 406 may also be referred to as code, which may be interpreted broadly to include any type of computer-readable statement(s) as discussed above with respect to FIG. 2.

The transceiver 414 may be, for example, an Ethernet connection, a WiFi connection, or any other connection that enables the cache server 112 to transmit and receive data to and from the base station 104 via the tunnel 150, the router 106 via the tunnel 152, and one or more web servers 116 via the network 114a.

The cache 412 may be flash memory, a solid state memory device, one or more hard disk drives, other forms of volatile and non-volatile memory, or a combination of different types of memory, such as discussed above with respect to memory 404. In some embodiments, the cache 412 may be a subset of the memory 404, while in other embodiments the cache 412 may be separate from the memory 404. The cache 412 is where cached content is located, for example as part of a CDN. The cache 412 may be, or include, a storage system that operates as network attached storage or as part of a storage area network to store the cached content, to name just a few examples.

The retrieval module 408 may operate in response to receipt of content requests via the tunnels 150 and/or 152. The retrieval module 408 may cause the processor 402 to search the cache 412 for the requested content in the packet(s). If the content is stored in the cache 412, the retrieval module 408 may retrieve the content and cause the transceiver 414 to transmit the content back along the channel by which the request came (e.g., tunnels 150 or 152). If the content is not in the cache 412, the retrieval module 408 may cause the transceiver 414 to access the relevant web server 116 to retrieve the content from the original destination. Once retrieved, the retrieval module 408 may direct the transceiver 414 to transmit the content back along the channel by which the request came. The retrieval module 408 may further cause the processor 402 to store the new content in the cache 412, if it is not in violation of user/system policy and/or the cache server 112 predicts that the content may be requested again in the future. In an embodiment, the retrieval module 408 may be executed by the processor 402 or may alternatively be a hardware module.

Figure 8:
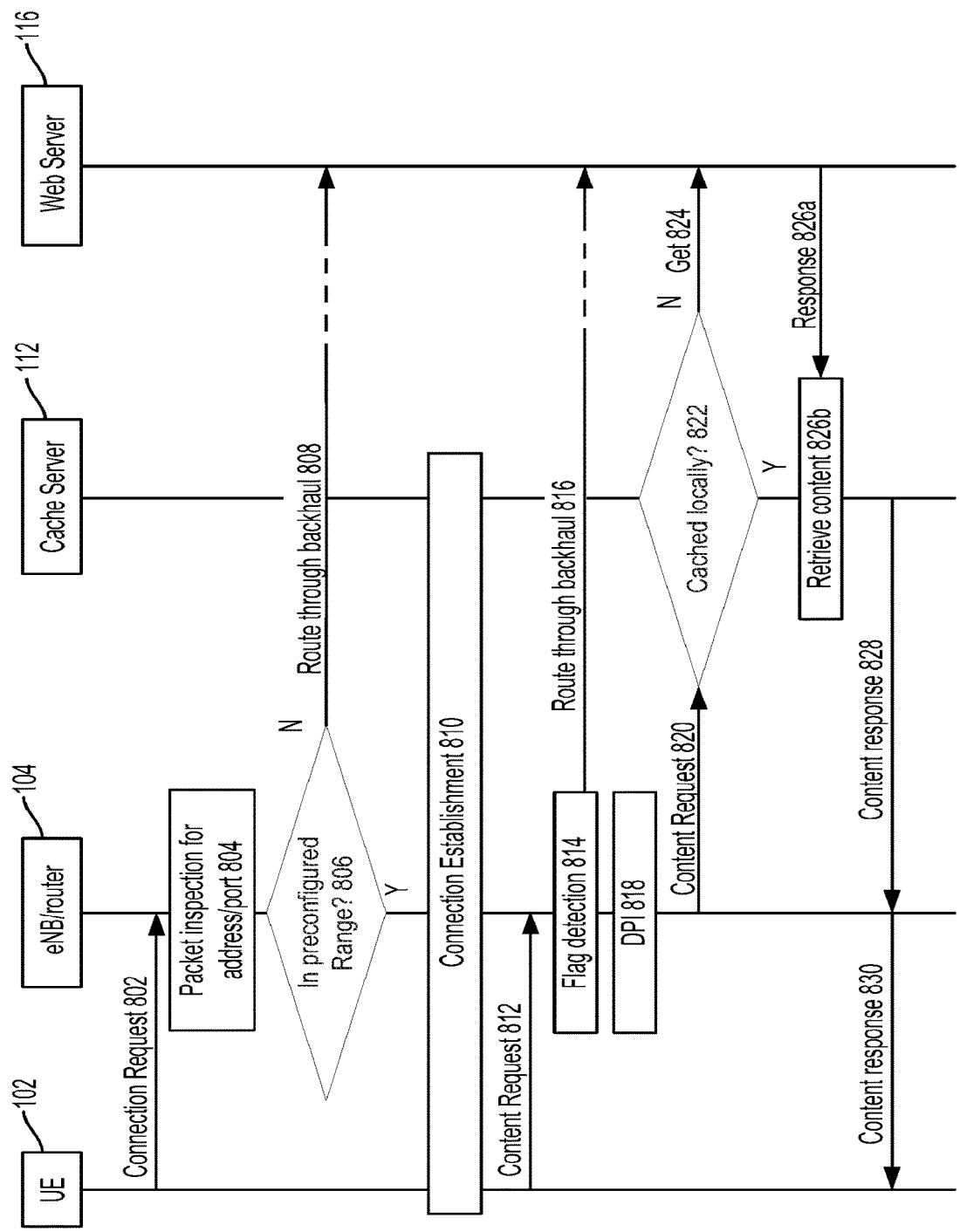
FIG. 8 illustrates an exemplary signaling diagram for deep packet inspection flagging according to aspects of the present disclosure.

FIG. 8 illustrates an exemplary signaling diagram for deep packet inspection flagging and DPI according to aspects of the present disclosure. The signaling in FIG. 8 corresponds to those embodiments discussed above with respect to FIG. 1 where the base station 104 incorporates router functionality (e.g., WCCP router functionality), instead of relying on a separate router 106. For simplicity of discussion, reference will be made in FIG. 8 to the UE 102, the base station 104, the cache server 112, and the web server 116. Further, the discussion will focus on those parts of the protocol flow that describe aspects of the present disclosure.

At action 802, the UE 102 sends a request to establish a connection with a network node, such as a web server with desired content, to the base station 104. This request to establish a connection may be, for example, a TCP connection establishment request. As part of this connection request, the UE 102 may already know the content which it is going to attempt to retrieve from the destination web server (e.g., web server 116) and set a DPI flag in one or more packets of the connection request on the uplink.

At action 804, the base station 104 receives the connection request and inspects one or more of the packets for the DPI flag. Where the flag is set, the base station 104 further inspects the packet for address (e.g., IP address) and/or port information for the connection request.

At action 806, the base station 104 determines whether the address and/or port information is within a preconfigured range for the serving network (e.g., a 3GPP network) in which the base station 104 is located. For example, the serving network may have an established agreement with one or more service providers that establishes one or more preconfigured ranges.

At action 808, if the address and/or port information is not within the preconfigured range, then the base station 104 routes the connection request and subsequent content request(s) through a backhaul of the serving network to the web server(s) 116 as is normally done, thereby bypassing the cache server 112.

At action 810, if the address and/or port information is within the preconfigured range, then the base station 104 assists in establishing a connection between the UE 102 and the cache server 112. In an embodiment, the connection may be a TCP connection that is established.

At action 812, after the connection has been established the UE 102 now sends a content request (e.g., as contained in one or more packets) to the base station 104. The UE 102 includes, as part of this content request, a DPI flag that has been set depending on whether the cache server 112 has been configured to cache content associated with the type of content (e.g., streaming video) in the request and/or with one or more protocols (HTTP, FTP, WDP, etc.).

At action 814, the base station 104 receives the content request with the corresponding status of the DPI flag and detects the DPI flag to determine whether it has been set or not. If the DPI flag was not set in a given packet, then at action 816 that packet is routed through the backhaul of the serving network to the web server(s) 116 as is normally done, thereby bypassing the cache server 112.

At action 818, if the base station 104 determined at action 814 that the DPI flag had been set, then the base station 104 performs deep packet inspection of the given packet to determine how to route the content request (e.g., to identify a cache server 112 that is associated with a CDN that serves the type of content or protocol that is identified in the packet).

At action 820, the base station 104, which includes router functionality as described above with respect to FIGS. 1 and 3A, establishes a tunnel (such as a GRE tunnel) or an L2 redirect to the cache server 112 and sends the content request to the cache server 112. This is done so that the original packet being routed does not change.

At action 822, the cache server 112 determines whether it has cached the content of the content request locally. If the cache server 112 has not cached it locally, the cache server 112 contacts the original destination web server 116 at action 824 to get the requested content. The web server 116 returns the requested content in a response to the cache server 112 at action 826a.

If the cache server 112 has previously cached the requested content, then at action 826b the cache server 112 retrieves the content.

Whether the content was obtained via actions 824/826a or 826b, the cache server 112 then at action 828 returns the content to the base station 104 via the previously established tunnel (or L2 redirect). In returning the content, the cache server 112 includes as the source address of the response the address of the original destination (i.e., the web server 116) so that the operations of the cache server 112 are transparent to the requesting UE 102.

At action 830, the base station 104 sends the content on to the UE 102, for example as part of one or more PDCP PDUs.

Figure 9:
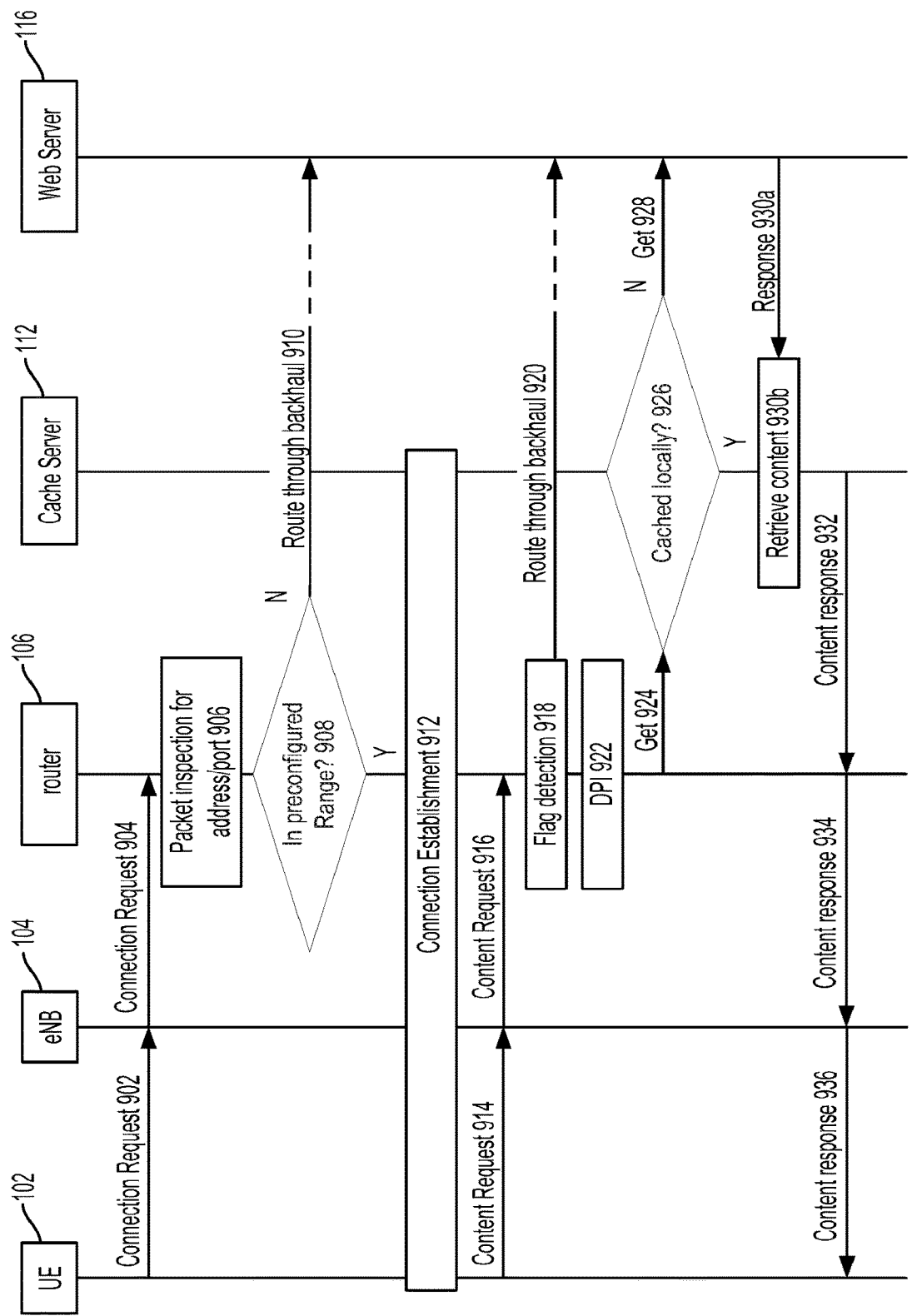
FIG. 9 illustrates an exemplary signaling diagram for deep packet inspection flagging according to aspects of the present disclosure.

FIG. 9 illustrates an exemplary signaling diagram for deep packet inspection flagging and DPI according to aspects of the present disclosure. The signaling in FIG. 9 corresponds to those embodiments discussed above with respect to FIG. 1 where the base station 104 does not incorporate router functionality but instead is in communication with a separate network node referred to as a router 106 (e.g., a WCCP router). For simplicity of discussion, reference will be made in FIG. 9 to the UE 102, the base station 104, the router 106, the cache server 112, and the web server 116. Further, the discussion will focus on those parts of the protocol flow that describe aspects of the present disclosure.

At action 902, the UE 102 sends a request to establish a connection with a network node, such as a web server with desired content, to the base station 104, for example as described above with respect to action 802 of FIG. 8.

At action 904, the base station 104 encapsulates the packet from the UE 102 using a tunneling protocol, such as GTP-U and sends the encapsulated request to the router 106.

At action 906, the router 106 receives the encapsulated connection request and inspects one or more of the packets for the DPI flag. Where the flag is set, the router 106 further inspects the packet for address (e.g., IP address) and/or port information for the connection request.

At action 908, the router 106 determines whether the address and/or port information is within a preconfigured range for the serving network as described above with respect to action 806.

At action 910, if the address and/or port information is not within the preconfigured range, then the router 106 routes the connection request and subsequent content request(s) through a backhaul of the serving network to the web server(s) 116 as described above with respect to action 808.

At action 912, if the address and/or port information is within the preconfigured range, then the router 106 assists in establishing a connection between the UE 102 and the cache server 112. In an embodiment, the connection may be a TCP connection that is established.

At action 914, after the connection has been established the UE 102 now sends a content request (e.g., as contained in one or more packets) to the base station 104. The UE 102 includes, as part of this content request, a DPI flag that has been set depending on whether the cache server 112 has been configured to cache content associated with the type of content (e.g., streaming video) in the request and/or with one or more protocols (HTTP, FTP, WDP, etc.).

At action 916, the base station 104 encapsulates the packet from the UE 102 using a tunneling protocol, such as GTP-U and sends the encapsulated request to the router 106. As part of this encapsulation, the base station 104 may set a corresponding indication in an extension header that is part of the tunneling protocol. This may be sent to the router 106, for example, via the S1-U interface.

At action 918, the router 106 receives the content request with the corresponding status of the DPI flag identified in the extension header and detects the DPI flag to determine whether it has been set or not. If the DPI flag was not set in a given packet, then at action 920 that packet is routed through the backhaul of the serving network to the web server(s) 116 as is normally done, as described above with respect to action 816.

At action 922, if the router 106 determined at action 918 that the DPI flag had been set, then the router 106 performs deep packet inspection of the given packet to determine how to route the content request (e.g., to identify a cache server 112 that is associated with a CDN that serves the type of content or protocol that is identified in the packet).

At action 924, the router 106, which includes router functionality as described above with respect to FIGS. 1 and 3B, establishes a tunnel (such as a GRE tunnel) or an L2 redirect to the cache server 112 and sends the content request to the cache server 112. This is done so that the original packet being routed does not change.

At action 926, the cache server 112 determines whether it has cached the content of the content request locally. If the cache server 112 has not cached it locally, the cache server 112 contacts the original destination web server 116 at action 928 to get the requested content. The web server 116 returns the requested content in a response to the cache server 112 at action 930a.

If the cache server 112 has previously cached the requested content, then at action 930b the cache server 112 retrieves the content.

Whether the content was obtained via actions 928/930a or 930b, the cache server 112 then at action 932 returns the content to the router 106 via the previously established tunnel (or L2 redirect). In returning the content, the cache server 112 includes as the source address of the response the address of the original destination (i.e., the web server 116) so that the operations of the cache server 112 are transparent to the requesting UE 102.

At action 934, the router 106 sends on the content to the base station 104, for example as part of one or more PDCP PDUs.

the base station 104 sends the content on to the UE 102, for example as part of one or more PDCP PDUs.

Figure 10:
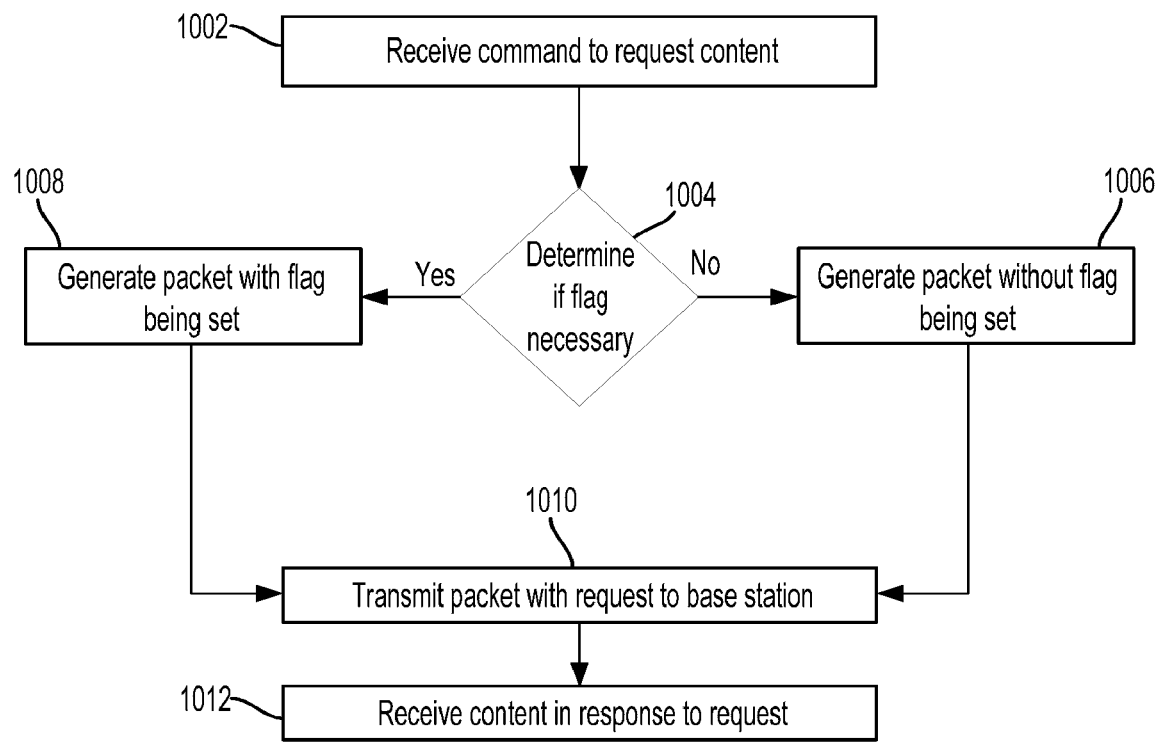
FIG. 10 is a flowchart illustrating an exemplary method for flagging packets at a user equipment in accordance with various aspects of the present disclosure.

Turning now to FIG. 10, a flowchart is presented that illustrates an exemplary method 1000 for flagging packets at a UE in accordance with various aspects of the present disclosure. The method 1000 may be implemented in the UE 102 as the UE 102 is in communication with a base station 104 The method 1000 will be described with respect to a specific UE 102 for simplicity of discussion, though it will be recognized that the aspects described herein may be applicable to any number of UEs 102. It is understood that additional steps can be provided before, during, and after the steps of method 1000, and that some of the steps described can be replaced or eliminated for other embodiments of the method 1000.

At block 1002, the UE 102 receives a command to request specified content from some location external to the UE 102, such as from a web server 116. This may be, for example, in response to an application receiving an input that requests content not stored locally.

At decision block 1004, the UE 102 determines whether the content and/or the protocol type of the content request are of a type that may be cached in the serving network to which the UE 102 is attached. This may be done, for example, by the flag insertion module 208 described above with respect to FIG. 2.

If the UE 102 determines that the content and/or protocol type of the content request are not of a type that may be cached, then the method 1000 proceeds to block 1006 where the UE 102 continues with generating packets for the content request without setting a DPI flag in any of these packets.

If the UE 102 determines that the content and/or protocol type of the content request are of a type that may be cached, then the method 1000 instead proceeds to block 1008, where the UE 102 (for example, by way of the flag insertion module 208) sets the DPI flag in the packets for which the determination was made.

From either block 1006 or 1008, the method 1000 proceeds to block 1010, where the UE 102 transmits the one or more packets (with or without a DPI flag being set) on an uplink to a base station 104. The base station 104, where it also acts as a router, detects the DPI flag where set and only performs DPI on packets that have the DPI flag set. In response to performing DPI, the base station 104 routes the qualifying packets to a cache server 112 (e.g., via a GRE tunnel or L2 redirect). Where the base station 104 does not act as a router, the base station 104 may encapsulate the qualifying packets after detecting the flag, without performing DPI, and send the encapsulated packets on to a router 106 for DPI and routing to the cache server 112.

As described above with respect to various figures, where the cache server 112 has already cached the content, it retrieves the content from its local cache and returns to the base station 104 or router 106, respectively. Where the cache server 112 does not have the content cached, the cache server 112 establishes a connection via one or more networks to the originally targeted web server 116 and obtains the content.

At block 1012, after the cache server 112 has returned the content to either the base station 104 or the router 106 (and the router 106 has sent the content on to the base station 104), the UE 102 receives the content from the base station 104 in response to the original request.

Figure 11:
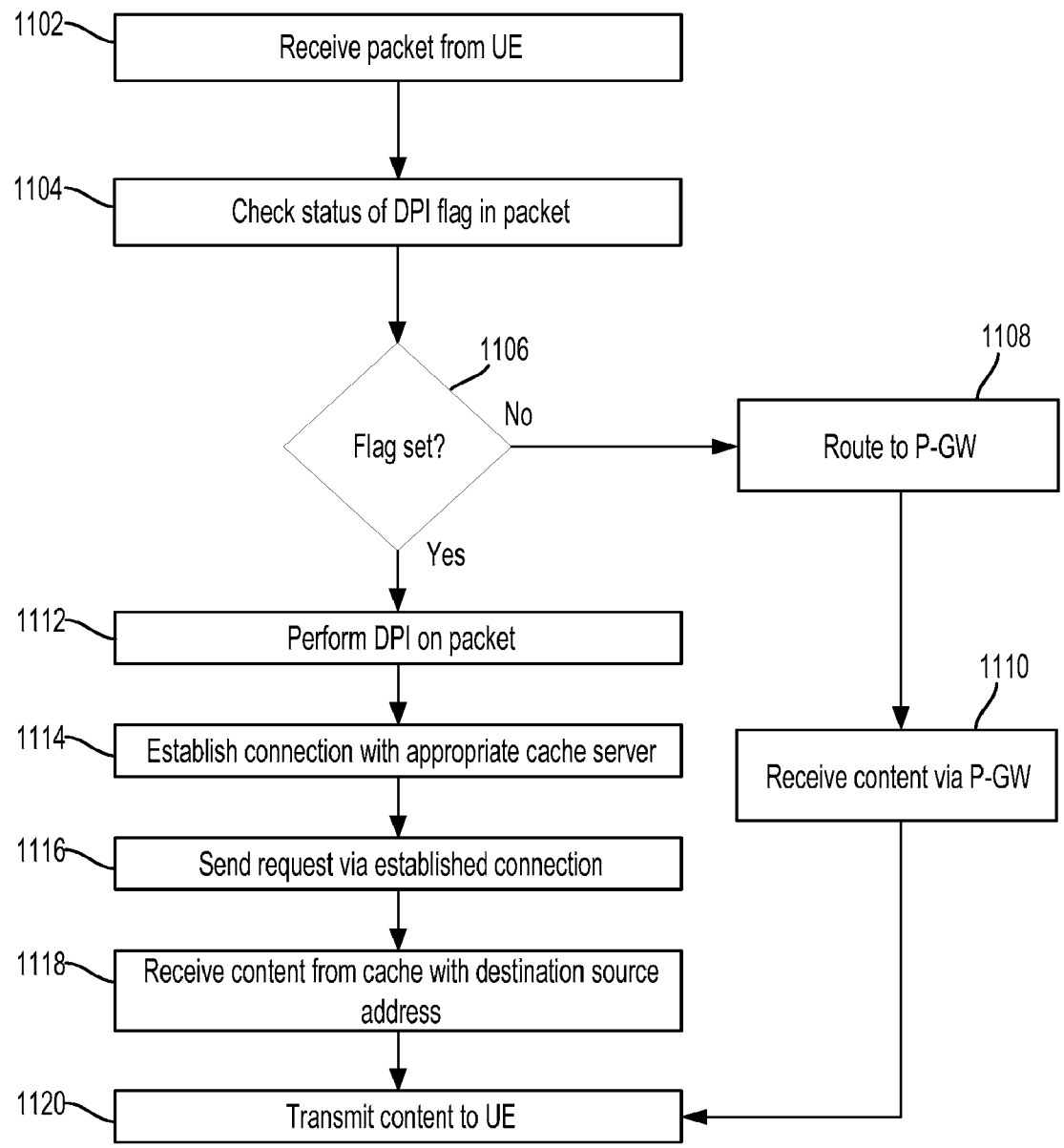
FIG. 11 is a flowchart illustrating an exemplary method for inspecting and routing packets at a base station in accordance with various aspects of the present disclosure.

Turning now to FIG. 11, a flowchart is presented that illustrates an exemplary method 1100 for inspecting and routing packets at a base station in accordance with various aspects of the present disclosure. The method 1100 may be implemented in a base station 104, for example as described above with respect to FIGS. 1 and 3A. The method 1100 will be described with respect to a specific packet for simplicity of discussion, though it will be recognized that the aspects described herein may be applicable to any number of packets. It is understood that additional steps can be provided before, during, and after the steps of method 1100, and that some of the steps described can be replaced or eliminated for other embodiments of the method 1100.

At block 1102, the base station 104 receives a packet from a UE 102, where the UE 102 has potentially set a DPI flag in the packet (e.g., in one or more reserved bits of a PDCP PDU, or as a new MAC CE, to name just a few examples).

At block 1104, the base station 104 checks a status of the DPI flag in the packet.

At decision block 1106, the base station 104 determines whether the DPI flag of the packet has been set, based on the check from block 1104. If not, then the method 1100 proceeds to block 1108.

At block 1108, the packet is routed to the P-GW 110 and through the backhaul of the serving network to the web server(s) 116 as is normally done, thereby bypassing the cache server 112 while also avoiding DPI (and the corresponding burden on processing and/or time).

At block 1110, the base station 104 receives the requested content in reply via the serving network and the P-GW 110.

Returning to decision block 1106, if the DPI flag has been set, then the method 1100 proceeds to block 1112. At block 1112, the base station 104 performs DPI of the packet to determine how to route the content request to an appropriate cache server 112.

At block 1114, the base station 104 operates with router functionality, e.g. as a WCCP router, and establishes a tunnel (such as a GRE tunnel) or an L2 redirect to the cache server 112.

At block 1116, the base station 104 sends the packet to the cache server 112 via the established tunnel/L2 redirect connection.

At block 1118, the base station 104 receives the requested content of the packet from the cache server 112 via the same tunnel (or L2 redirect connection) as was established at block 1114. In an embodiment, the cache server 112 retrieves the content from its local storage if the content has already been cached there. Otherwise, the cache server 112 connects to one or more networks 114a to reach the original destination web server 116 to obtain the content. Once the cache server 112 obtains the content, it may cache it for future use.

At block 1120, whether the content has been obtained from the cache server 112 as a result of blocks 1112-1120 or blocks 1108-1110, the base station 104 transmits the requested content back to the UE 102 via a downlink channel.

Figure 12:
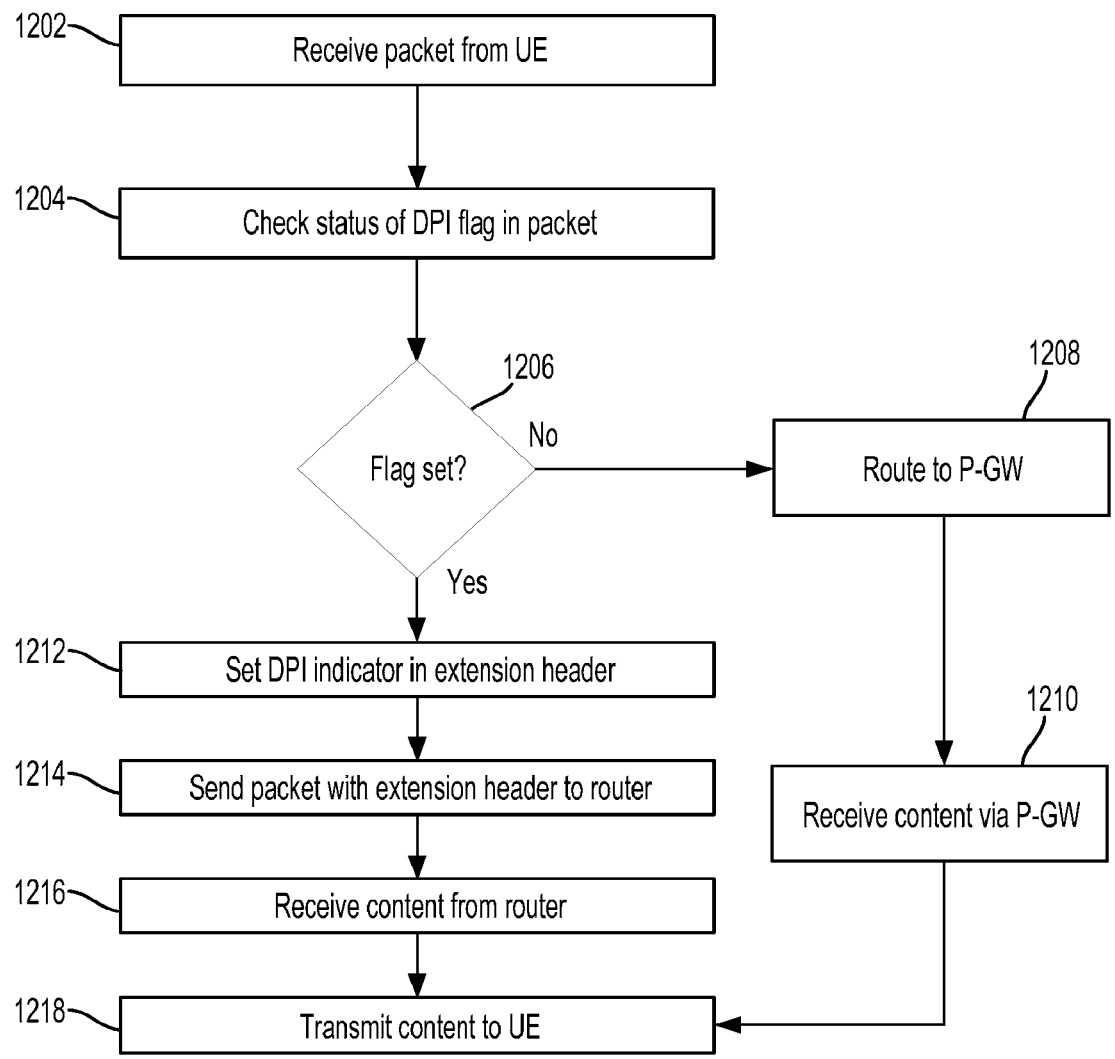
FIG. 12 is a flowchart illustrating an exemplary method for inspecting and routing packets at an intermediate node in accordance with various aspects of the present disclosure.

FIG. 12 is a flowchart illustrating an exemplary method 1200 for inspecting and routing packets at an intermediate node in accordance with various aspects of the present disclosure. The method 1200 may be implemented in a base station 104, for example as described above with respect to FIGS. 1 and 3B. The method 1200 will be described with respect to a specific packet for simplicity of discussion, though it will be recognized that the aspects described herein may be applicable to any number of packets. It is understood that additional steps can be provided before, during, and after the steps of method 1200, and that some of the steps described can be replaced or eliminated for other embodiments of the method 1200.

At block 1202, the base station 104 receives a packet from a UE 102, where the UE 102 has potentially set a DPI flag in the packet (e.g., in one or more reserved bits of a PDCP PDU, or as a new MAC CE, to name just a few examples).

At block 1204, the base station 104 checks a status of the DPI flag in the packet.

At decision block 1206, the base station 104 determines whether the DPI flag of the packet has been set, based on the check from block 1204. If not, then the method 1200 proceeds to block 1208.

At block 1208, the packet is routed to the P-GW 110 and through the backhaul of the serving network to the web server(s) 116 as is normally done, thereby bypassing the cache server 112 while also avoiding DPI (and the corresponding burden on processing and/or time).

At block 1210, the base station 104 receives the requested content in reply via the serving network and the P-GW 110.

Returning to decision block 1206, if the DPI flag has been set, then the method 1200 proceeds to block 1212. At block 1212, the base station 104 encapsulates the packet from the UE 102 using a tunneling protocol, such as GTP-U and sets an indication in an extension header that the DPI flag has been set, for example as described above with respect to FIG. 7. This may be sent to the router 106, for example, via the S1-U interface At block 1214, since the base station 104 does not operate with router functionality, the base station 104 sends the encapsulated packet to an intermediate network node, such as router 106 (which may be, for example, a WCCP router). The router 106, in turn, may perform DPI and establish a tunnel (such as a GRE tunnel) or an L2 redirect to the cache server 112. After sending the packet on to the cache server 112 via the tunnel, the router 106 receives the requested content of the packet from the cache server 112 via the same tunnel (or L2 redirect connection) as was already established. In an embodiment, the cache server 112 retrieves the content from its local storage if the content has already been cached there. Otherwise, the cache server 112 connects to one or more networks 114*a* to reach the original destination web server 116 to obtain the content. Once the cache server 112 obtains the content, it may cache it for future use.

At block 1216, the base station 104 receives the content from the router 106 after it has been received from the cache server 112.

At block 1218, whether the content has been obtained from the cache server 112 as a result of blocks 1212-1218 or blocks 1208-1210, the base station 104 transmits the requested content back to the UE 102 via a downlink channel.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. An apparatus, comprising:
   a memory;
   a transceiver configured to receive one or more packets from a separate device, the one or more packets including a flag specifying whether requested content should be obtained from a cache of a cache server, the one or more packets comprising one of a packet data convergence protocol (PDCP) protocol data unit (PDU) or a media access control (MAC) layer control element (CE); and
   a processor coupled to the memory, the memory and the processor configured to:
      check the flag included in the one or more packets; and
      determine the flag as specifying that the requested content should be obtained from the cache of the cache server,
   wherein the transceiver is further configured to:
      transmit the one or more packets to the cache server, in response to the determination; and
      receive the requested content from the cache of the cache server.

2. The apparatus of claim 1, wherein the one or more packets comprises the PDCP PDU, and the flag is set in one or more bits of the PDCP PDU, the memory and the processor being further configured, for the checking, to:
   check the one or more bits of the PDCP PDU for a status of the flag identifying whether the requested content should be obtained from the cache of the cache server.

3. The apparatus of claim 1, wherein the one or more packets comprises the MAC CE, the memory and the processor being further configured, for the checking, to:
   check an indication section of the MAC CE that comprises the flag for a status of the flag identifying whether the requested content should be obtained from the cache of the cache server.

4. The apparatus of claim 1, wherein the transceiver is further configured to:
  route, for the transmitting, the one or more packets on in response to determining that the flag specifies obtaining the requested content from a device different from the cache server.

5. The apparatus of claim 1, wherein the transceiver is further configured to:
  transmit the requested content to the separate device in response to receiving the requested content from the cache server.

6. The apparatus of claim 1, wherein the memory and the processor are further configured to:
  establish, in response to the determination, a tunnel to the cache server by which to transmit the one or more packets to the cache server and receive the requested content from the cache server.

7. The apparatus of claim 1, wherein the transceiver is further configured, for the transmitting, to:
  send, in response to the determination, the one or more packets to an intermediate network node between the apparatus and the cache server for transmitting to the cache server.

8. The apparatus of claim 7, wherein:
  the memory and the processor are further configured to propagate the flag, in response to the determination, to a message extension header associated with the one or more packets, and
  the transceiver is further configured, for the sending, to send the one or more packets to the intermediate network node with the message extension header.

9. The apparatus of claim 1, wherein the apparatus comprises a base station and the separate device comprises a user equipment.

10. An apparatus, comprising:
  a memory;
  a processor coupled to the memory, the memory and the processor configured to:
    generate one or more packets as part of an uplink message including a request for content, the one or more packets including a flag specifying whether requested content should be obtained from a cache of a cache server, the one or more packets comprising one of a packet data convergence protocol (PDCP) protocol data unit (PDU) or a media access control (MAC) layer control element (CE); and
    set, in response to the content being for a predetermined type of content, the flag in the one or more packets; and
  a transceiver coupled to the memory and the processor and configured to transmit the one or more packets comprising the flag to a separate device to handle the request.

11. The apparatus of claim 10, wherein the one or more packets comprises the PDCP PDU, and the flag is set in one or more bits of the PDCP PDU, the memory and the processor being further configured, for the setting, to:
  set the one or more bits of the PDCP PDU as a status of the flag identifying whether the requested content should be obtained from the cache of the cache server.

12. The apparatus of claim 10, wherein the one or more packets comprises the MAC CE, the memory and the processor being further configured, for the setting, to:
  set an indication section of the MAC CE that comprises the flag as a status of the flag identifying whether the requested content should be obtained from the cache of the cache server.

13. The apparatus of claim 10, wherein the transceiver is further configured to:
  receive the requested content from the cache of the cache server via the separate device.

14. The apparatus of claim 10, wherein the apparatus comprises a user equipment and the separate device comprises a base station.

15. An apparatus, comprising:
  a cache configured to store content;
  a transceiver configured to receive one or more packets from a separate device and via an intermediate device in response to the one or more packets including a flag specifying whether requested content should be obtained from the cache, the one or more packets comprising one of a packet data convergence protocol (PDCP) protocol data unit (PDU) or a media access control (MAC) layer control element (CE); and
  a processor coupled to the cache and the transceiver and configured to retrieve the content from the cache in response to the receipt of the one or more packets including the flag,
  wherein the transceiver is further configured to transmit the retrieved content to the intermediate device for transmission to the separate device.

16. The apparatus of claim 15, wherein the one or more packets comprises the PDCP PDU, and the flag is set in one or more bits of the PDCP PDU.

17. The apparatus of claim 15, wherein the one or more packets comprises the MAC CE.

18. The apparatus of claim 15, wherein the transceiver is further configured to receive the one or more packets transmitted from the intermediate device via a tunnel between the apparatus and the intermediate device.

19. The apparatus of claim 15, wherein the processor is further configured to:
  retrieve the content from a web server in response to failing to retrieve the content from the cache, and
  store the content in the cache in response to the retrieval from the web server.

20. The apparatus of claim 15, wherein the apparatus comprises a cache server, the intermediate device comprises a base station, and the separate device comprises a user equipment.

21. A method for wireless communications by a first device, comprising:
  receiving, by the first device, a packet from a separate device, the packet including a flag specifying whether requested content should be obtained from a cache of a cache server, the packet comprising one of a packet data convergence protocol (PDCP) protocol data unit (PDU) or a media access control (MAC) layer control element (CE);
  checking the flag included in the packet;
  determining the flag as specifying that the requested content should be obtained from the cache of the cache server;
  transmitting the packet to the cache server, in response to the determining; and
  receiving the requested content from the cache of the cache server.

22. The method of claim 21, wherein the packet comprises the PDCP PDU, and the flag is set in one or more bits of the PDCP PDU, wherein checking the flag comprises:
  checking the one or more bits of the PDCP PDU for a status of the flag identifying whether the requested content should be obtained from the cache of the cache server.

23. The method of claim 21, wherein the packet comprises the MAC CE, wherein checking the flag comprises:
checking an indication section of the MAC CE that comprises the flag for a status of the flag identifying whether the requested content should be obtained from the cache of the cache server.

24. The method of claim 21, the method further comprising:
routing, for the transmitting, the packet on in response to determining that the flag specifies obtaining the requested content from a device different from the cache server.

25. The method of claim 21, the method further comprising:
transmitting the requested content to the separate device in response to receiving the requested content from the cache server.

26. The method of claim 21, the method further comprising:
establishing, in response to the determining, a tunnel to the cache server by which to transmit the one or more packets to the cache server and receive the requested content from the cache server.

27. The method of claim 21, the transmitting the packet to the cache server, in response to the determining, comprises:
sending, in response to the determining, the packet to an intermediate network node between the base station and the cache server for transmitting to the cache server.

28. The method of claim 27, the method further comprising:
propagating the flag, in response to the determining, to a message extension header associated with the packet, wherein the sending, in response to the determining, comprises sending the packet to the intermediate network node with the message extension header.

29. The method of claim 21, wherein the first device comprises a base station and the separate device comprises a user equipment.

30. A non-transitory computer-readable medium having program code recorded thereon, the program code comprising:
code for causing a first device to receive a packet from a separate device, the packet including a flag specifying whether requested content should be obtained from a cache of a cache server, the packet comprising one of a packet data convergence protocol (PDCP) protocol data unit (PDU) or a media access control (MAC) layer control element (CE);
code for causing the first device to check the flag included in the packet;
code for causing the first device to determine the flag as specifying that the requested content should be obtained from the cache of the cache server;
code for causing the first device to transmit the packet to the cache server, in response to the determination; and
code for causing the first device to receive the requested content from the cache of the cache server.

31. The computer-readable medium of claim 30, wherein the packet comprises the PDCP PDU, and the flag is set in one or more bits of the PDCP PDU, wherein the code for causing the first device to check the flag comprises:
code for causing the first device to check the one or more bits of the PDCP PDU for a status of the flag identifying whether the requested content should be obtained from the cache of the cache server.

32. The computer-readable medium of claim 30, wherein the packet comprises the MAC CE, wherein the code for causing the first device to check the flag comprises:
code for causing the first device to check an indication section of the MAC CE that comprises the flag for a status of the flag identifying whether the requested content should be obtained from the cache of the cache server.

33. A method for wireless communications by a first device, the method comprising:
generating, by the first device, a packet as part of an uplink message including a request for content, the packet including a flag specifying whether requested content should be obtained from a cache of a cache server, the packet comprising one of a packet data convergence protocol (PDCP) protocol data unit (PDU) or a media access control (MAC) layer control element (CE);
setting, in response to the content being for a predetermined type of content, the flag in the packet; and
transmitting the packet comprising the flag to a separate device to handle the request.

34. The method of claim 33, wherein the packet comprises the PDCP PDU, and the flag is set in one or more bits of the PDCP PDU, wherein the setting comprises:
setting the one or more bits of the PDCP PDU as a status of the flag identifying whether the requested content should be obtained from the cache of the cache server.

35. The method of claim 33, wherein the packet comprises the MAC CE, wherein the setting comprises:
setting an indication section of the MAC CE that comprises the flag as a status of the flag identifying whether the requested content should be obtained from the cache of the cache server.

36. The method of claim 33, the method further comprising:
receiving the requested content from the cache of the cache server via the separate device.

37. The method of claim 33, wherein the first device comprises a user equipment and the separate device comprises a base station.

38. A non-transitory computer-readable medium having program code recorded thereon, the program code comprising:
code for causing a first device to generate a packet as part of an uplink message including a request for content, the packet including a flag specifying whether requested content should be obtained from a cache of a cache server, the packet comprising one of a packet data convergence protocol (PDCP) protocol data unit (PDU) or a media access control (MAC) layer control element (CE);
code for causing the first device to set, in response to the content being for a predetermined type of content, the flag in the packet; and
code for causing the first device to transmit the packet comprising the flag to a separate device to handle the request.

39. The computer-readable medium of claim 38, wherein the packet comprises the PDCP PDU, and the flag is set in one or more bits of the PDCP PDU, wherein the code for causing the first device to set comprises:
code for causing the first device to set the one or more bits of the PDCP PDU as a status of the flag identifying whether the requested content should be obtained from the cache of the cache server.

40. The computer-readable medium of claim 38, wherein the packet comprises the MAC CE, wherein the code for causing the first device to set comprises:
   code for causing the first device to set an indication section of the MAC CE that comprises the flag as a status of the flag identifying whether the requested content should be obtained from the cache of the cache server.

41. A method for wireless communications by an apparatus, the method comprising:
   receiving, by the apparatus, a packet from a separate device and via an intermediate device in response to the packet including a flag specifying whether requested content should be obtained from a cache of the apparatus, the packet comprising one of a packet data convergence protocol (PDCP) protocol data unit (PDU) or a media access control (MAC) layer control element (CE);
   retrieving the content from the cache in response to the receipt of the packet including the flag; and
   transmitting the retrieved content to the intermediate device for transmission to the separate device.

42. The method of claim 41, wherein the packet comprises the PDCP PDU, and the flag is set in one or more bits of the PDCP PDU.

43. The method of claim 41, wherein the packet comprises the MAC CE.

44. The method of claim 41, the method further comprising:
   receiving the packet transmitted from the intermediate device via a tunnel between the apparatus and the intermediate device.

45. The method of claim 41, the method further comprising:
   retrieving the content from a web server in response to failing to retrieve the content from the cache of the apparatus; and
   storing the content in the cache in response to the retrieval from the web server.

46. The method of claim 41, wherein the apparatus comprise a cache server, the intermediate device comprises a base station, and the separate device comprises a user equipment.

47. A non-transitory computer-readable medium having program code recorded thereon, the program code comprising:
   code for causing an apparatus to receive a packet from a separate device and via an intermediate device in response to the packet including a flag specifying whether requested content should be obtained from a cache of the apparatus, the packet comprising one of a packet data convergence protocol (PDCP) protocol data unit (PDU) or a media access control (MAC) layer control element (CE);
   code for causing the apparatus to retrieve the content from the cache in response to the receipt of the packet including the flag; and
   code for causing the apparatus to transmit the retrieved content to the intermediate device for transmission to the separate device.

48. The computer-readable medium of claim 47, wherein the packet comprises the PDCP PDU, and the flag is set in one or more bits of the PDCP PDU.

49. The computer-readable medium of claim 47, wherein the packet comprises the MAC CE.

50. An apparatus, comprising:
   a memory;
   a transceiver configured to receive one or more packets from a separate device, the one or more packets including a flag specifying whether requested content should be obtained from a cache of a cache server; and
   a processor coupled to the memory, the memory and the processor configured to:
      check the flag included in the one or more packets;
      determine the flag as specifying that the requested content should be obtained from the cache of the cache server; and
      propagate the flag, in response to the determination, to a message extension header associated with the one or more packets,
   wherein the transceiver is further configured to:
      send, in response to the determination, the one or more packets with the message extension header to an intermediate network node between the apparatus and the cache server for transmitting to the cache server; and
      receive the requested content from the cache of the cache server.

* * * * *